United States Patent
Kawabe

(10) Patent No.: US 10,540,999 B1
(45) Date of Patent: Jan. 21, 2020

(54) MAGNETIC DISK DEVICE AND WRITE PROCESSING METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Takayuki Kawabe, Sagamihara Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/284,238

(22) Filed: Feb. 25, 2019

(30) Foreign Application Priority Data

Sep. 10, 2018  (JP) .................................. 2018-168878

(51) Int. Cl.
   *G11B 5/09*   (2006.01)
   *G11B 21/10*  (2006.01)
   *G11B 5/012*  (2006.01)

(52) U.S. Cl.
   CPC ............ *G11B 21/106* (2013.01); *G11B 5/012* (2013.01)

(58) Field of Classification Search
   None
   See application file for complete search history.

(56) References Cited

U.S. PATENT DOCUMENTS

| 5,184,257 A * | 2/1993 | Koga .................... G11B 5/5552 360/77.04 |
| 6,636,376 B1 | 10/2003 | Ho |
| 8,885,284 B2 | 11/2014 | Kashiwagi et al. |
| 8,896,959 B1 | 11/2014 | Kashiwagi et al. |
| 9,026,728 B1 | 5/2015 | Xi et al. |
| 9,424,870 B2 | 8/2016 | Lee et al. |
| 2001/0017831 A1* | 8/2001 | Shimamura .......... G11B 7/0037 369/53.24 |
| 2003/0063404 A1* | 4/2003 | Takaishi ............... G11B 5/5526 360/29 |
| 2009/0010119 A1* | 1/2009 | Kayama ................ G11B 7/094 369/47.15 |
| 2012/0176698 A1* | 7/2012 | Rub ....................... G11B 5/012 360/31 |
| 2018/0197567 A1 | 7/2018 | Kawabe et al. |

FOREIGN PATENT DOCUMENTS

| JP | 2014-89780 A | 5/2014 |
| JP | 2018-113085 A | 7/2018 |

* cited by examiner

*Primary Examiner* — Peter Vincent Agustin
(74) *Attorney, Agent, or Firm* — White & Case LLP

(57) ABSTRACT

According to one embodiment, a magnetic disk device includes a disk, a head that writes data to the disk and reads data from the disk, and a controller that obtains a gain to be changed according to a first value calculated based on first position information of the head and second position information of the head when writing a first track to the disk, calculates third position information of the head calculated based on the gain and the second position information, and writes a second track adjacent to the first track in a radial direction according to the third position information.

20 Claims, 12 Drawing Sheets

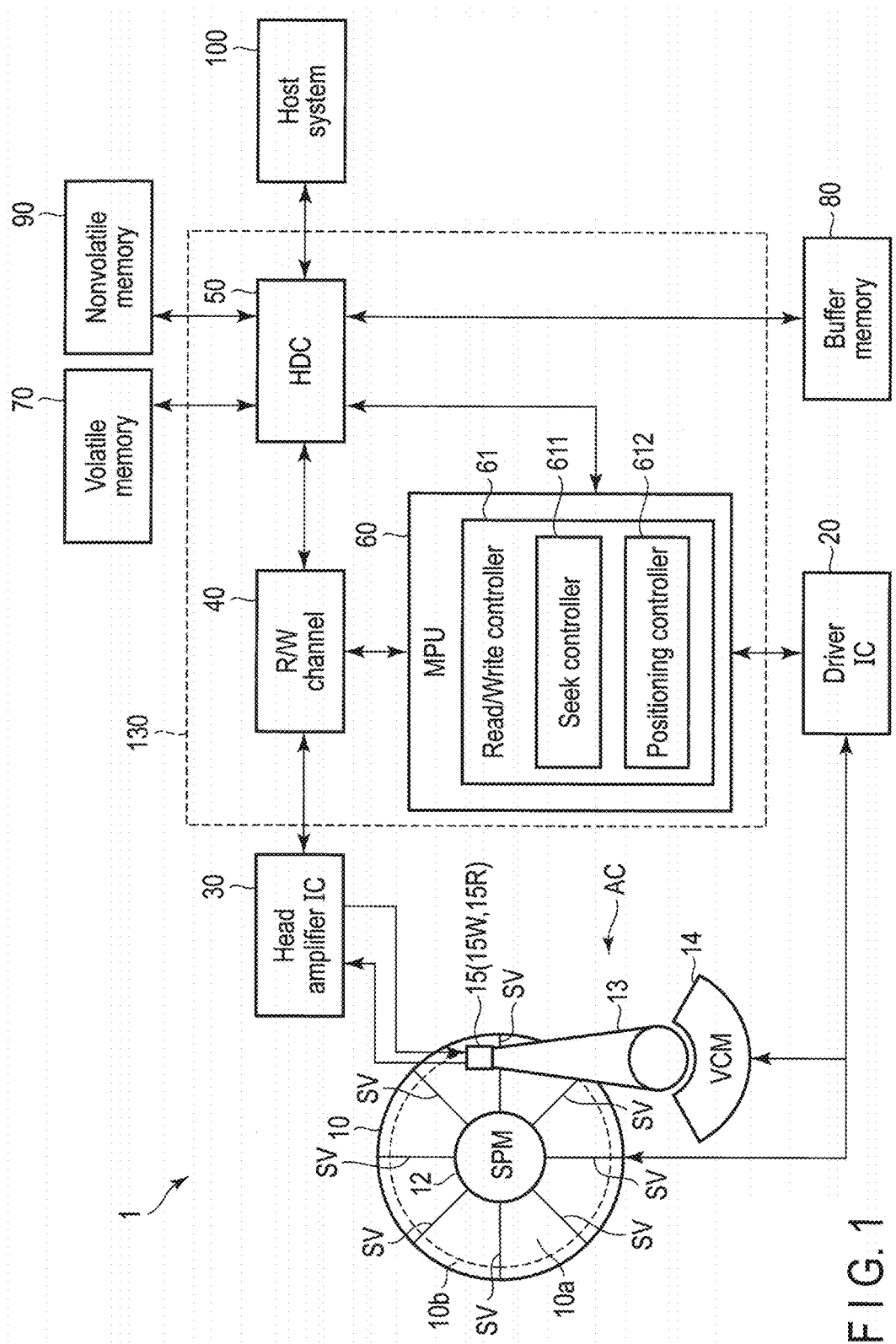
F I G. 1

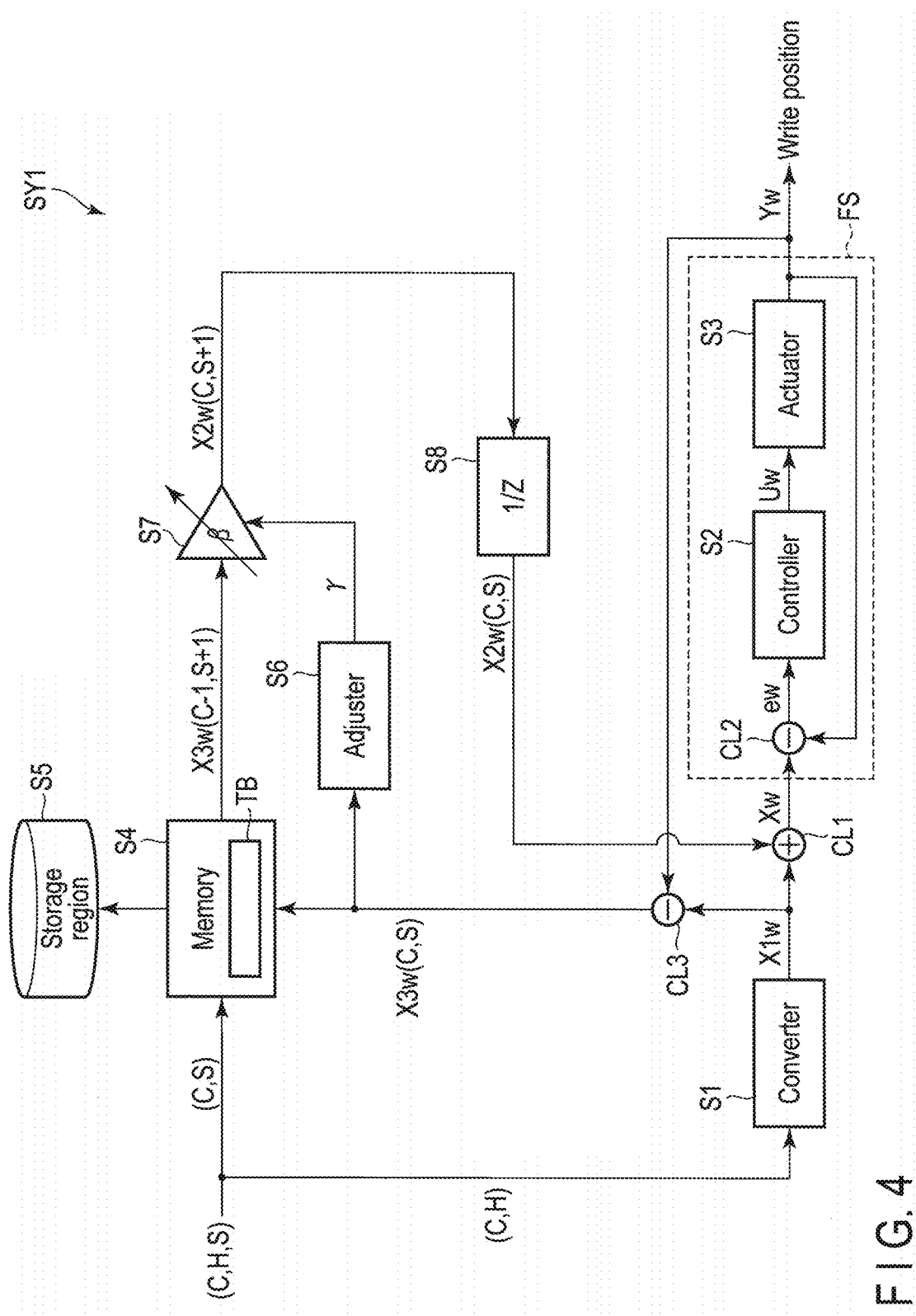
F I G. 4

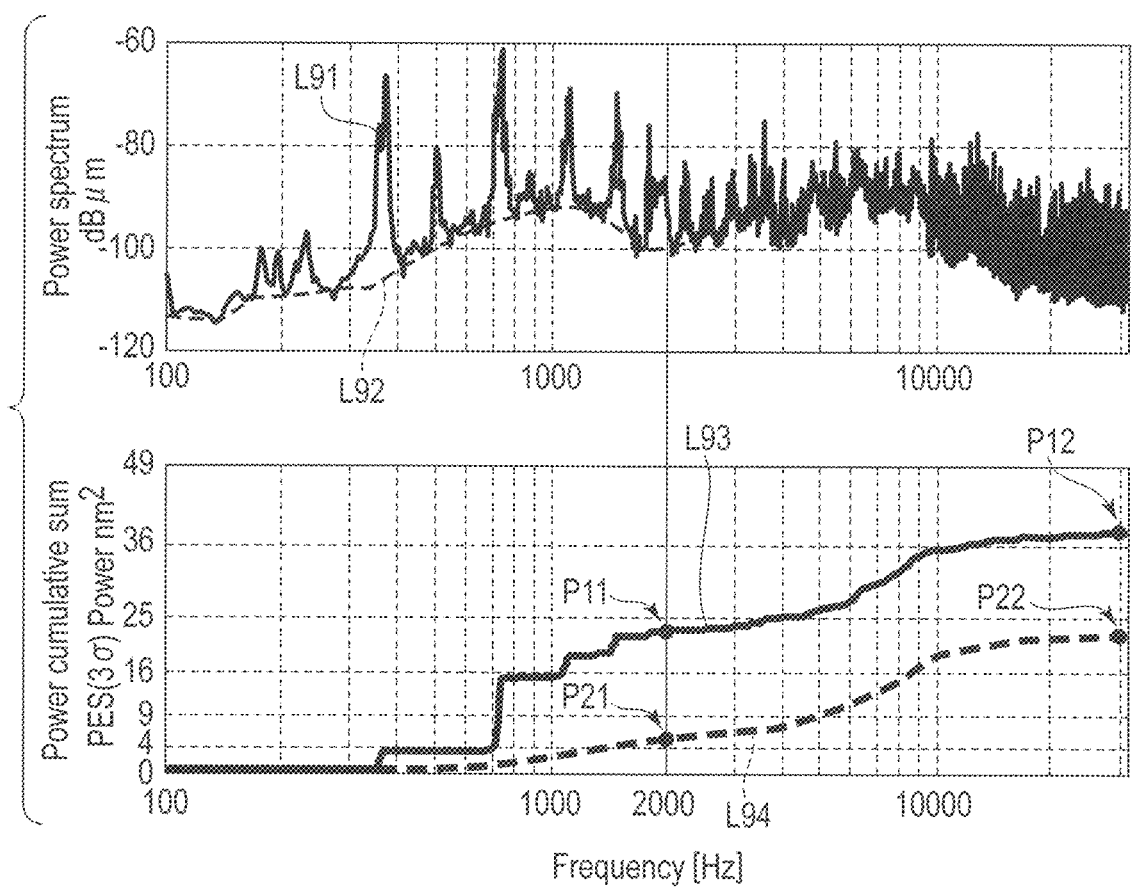
F I G. 9

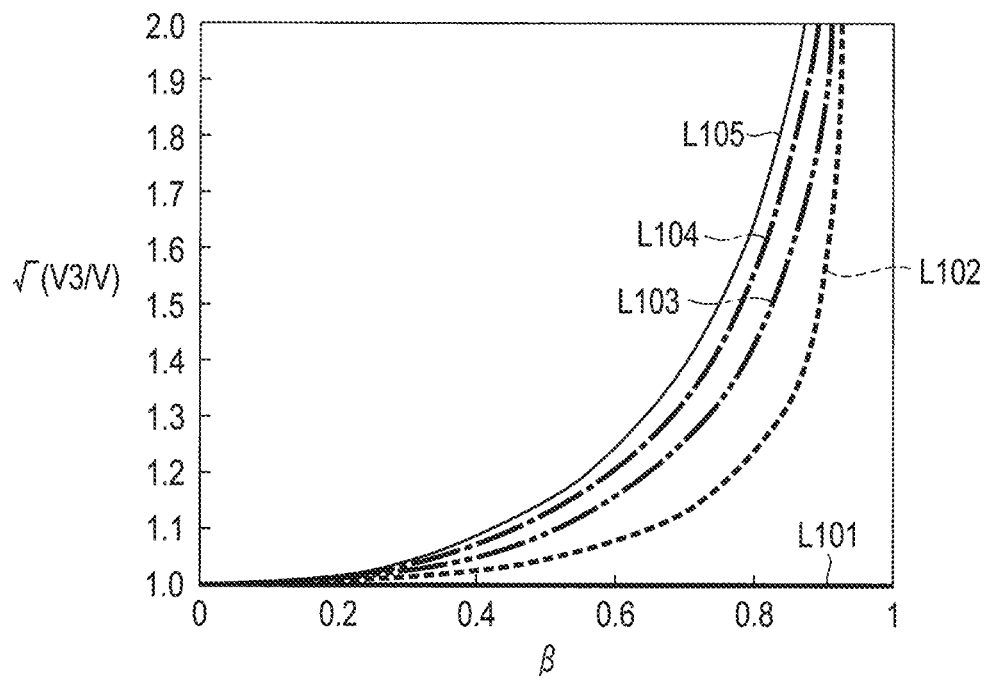
F I G. 10
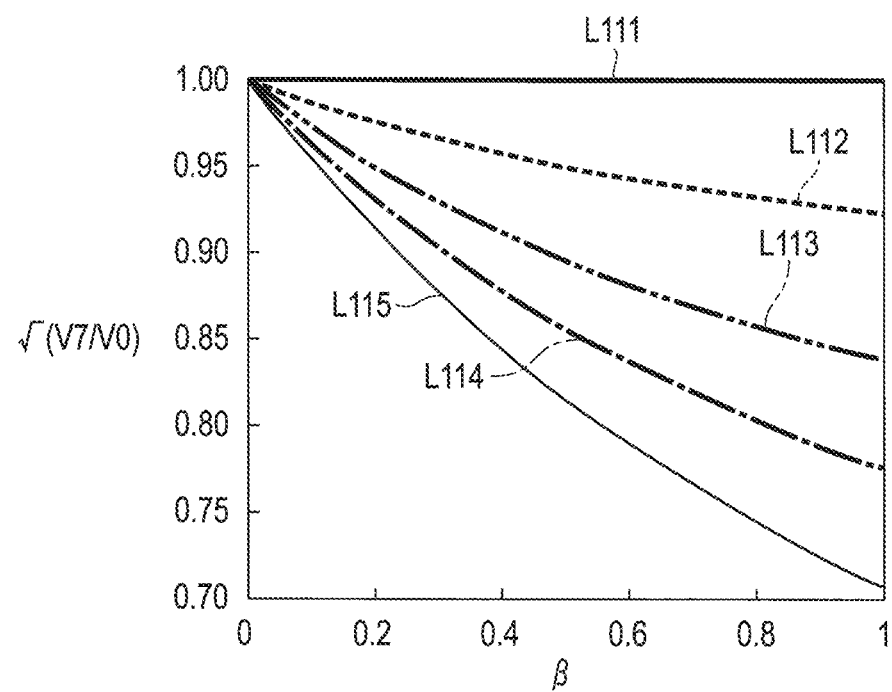
F I G. 11

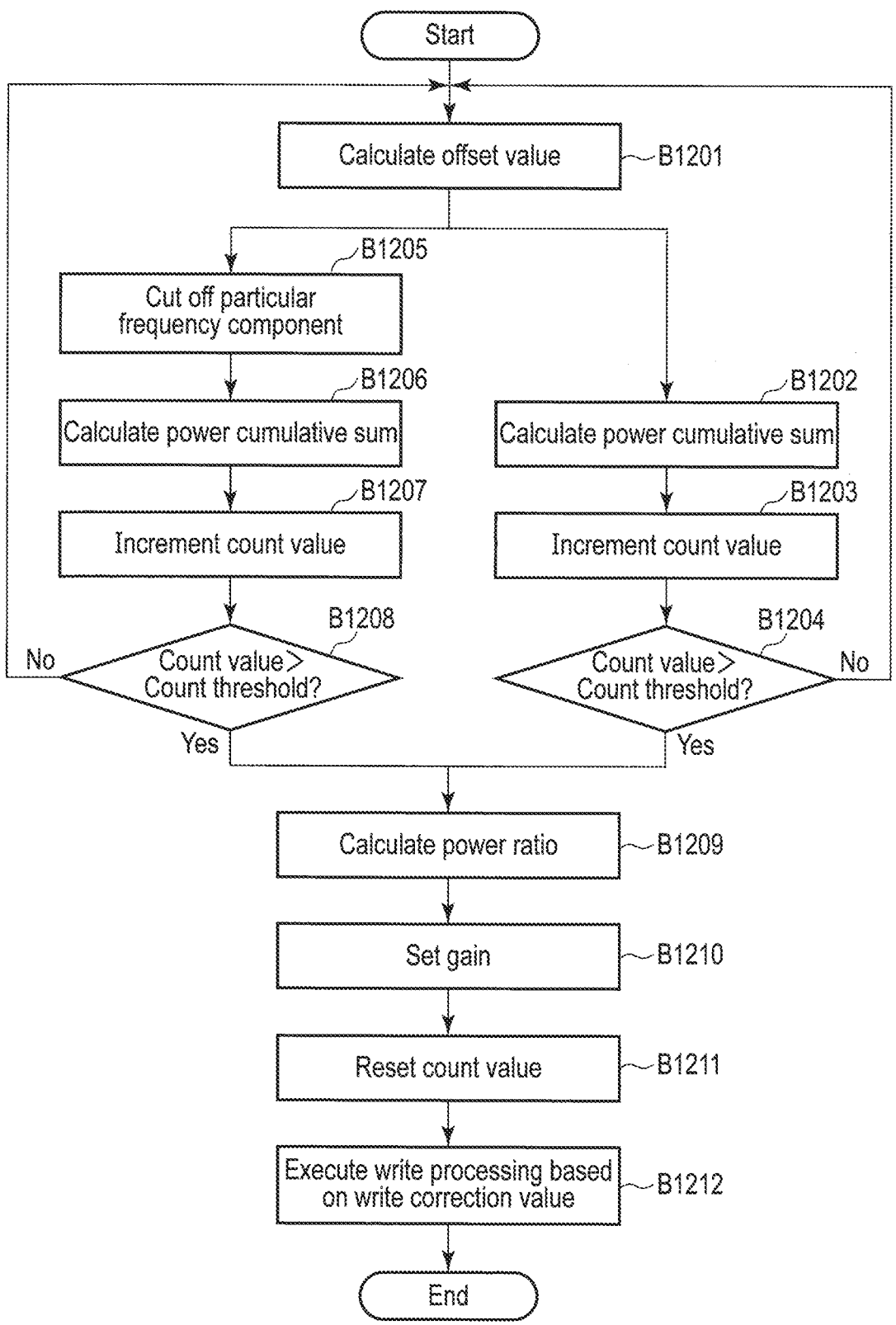
F I G. 12

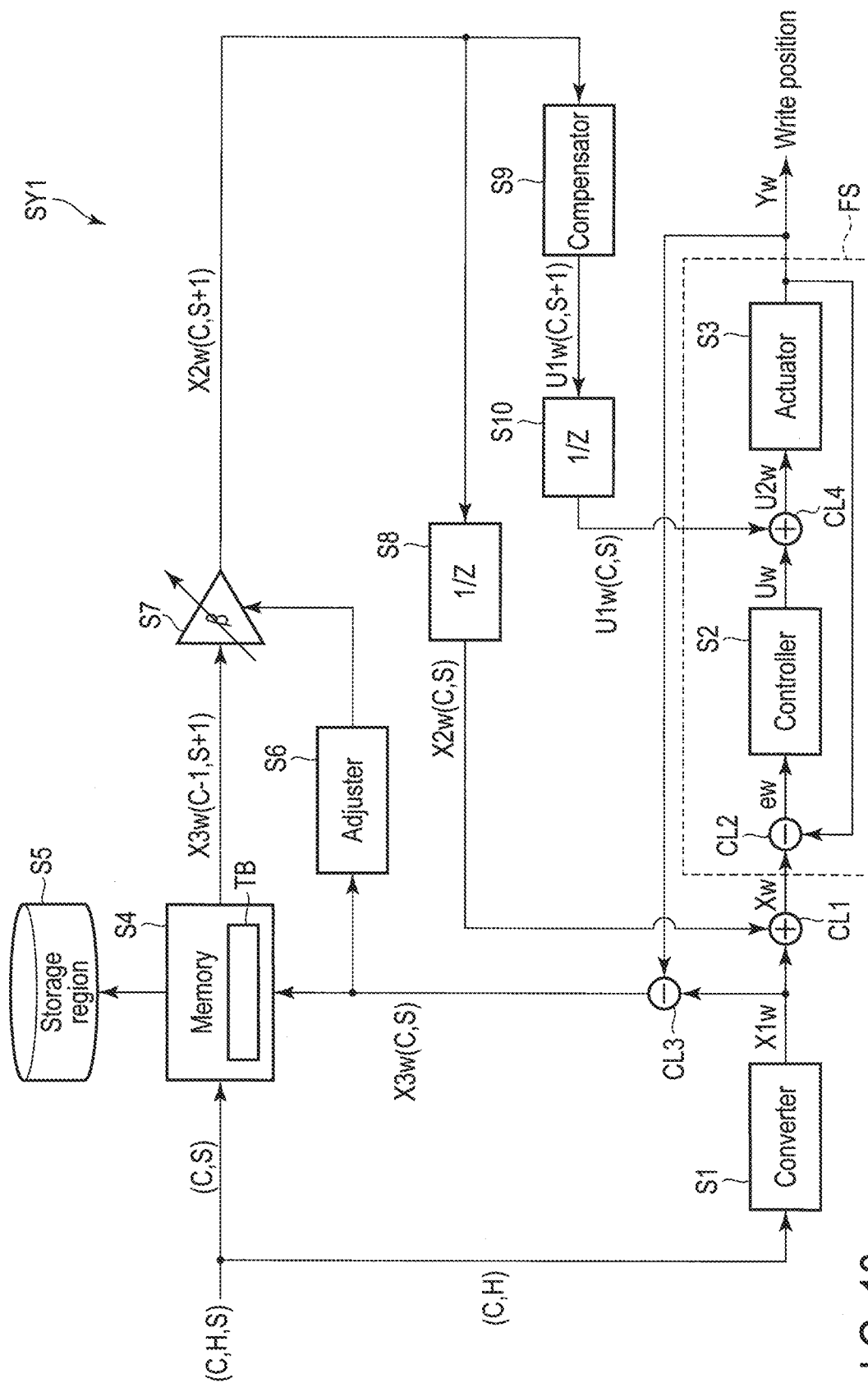
F I G. 13

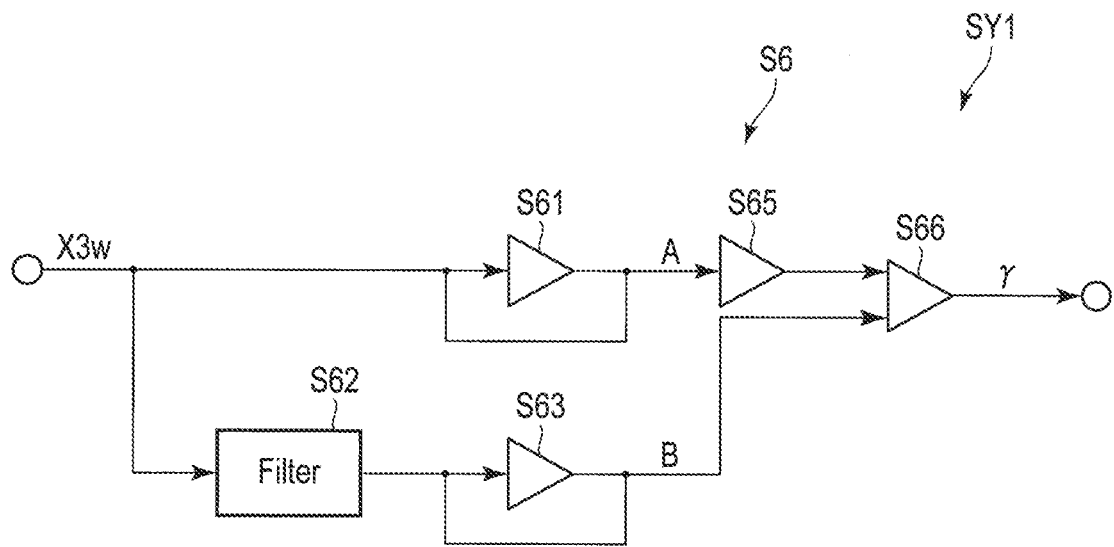
F I G. 14
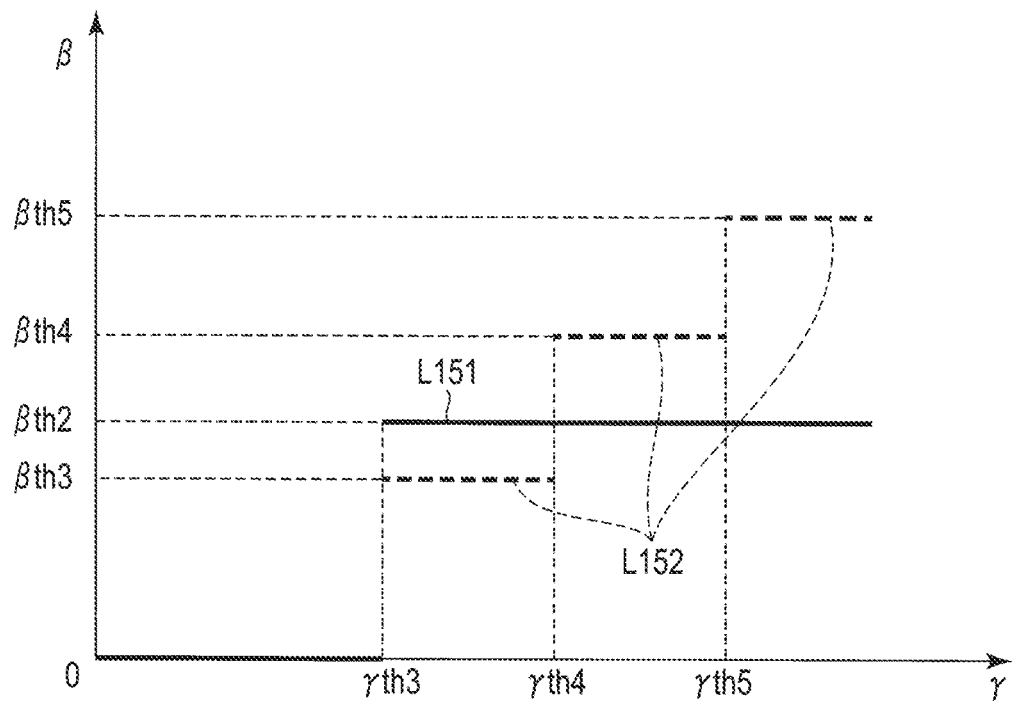
F I G. 15

US 10,540,999 B1

MAGNETIC DISK DEVICE AND WRITE PROCESSING METHOD

CROSS-REFERENCE TO RELATED APPLICATIONS

This application is based upon and claims the benefit of priority from Japanese Patent Application No. 2018-168878, filed Sep. 10, 2018, the entire contents of which are incorporated herein by reference.

FIELD

Embodiments described herein relate generally to a magnetic disk device and a write processing method.

BACKGROUND

In recent years, various techniques for realizing high recording capacity of a magnetic disk device have been developed. One of the techniques is a recording technique called shingled write magnetic recording (SMR) or shingled write recording (SWR). The SMR magnetic disk device writes a subsequent recording track to overlap with a part of a track adjacent in the radial direction of a disk at the time of writing data to the magnetic disk. In the SMR magnetic disk device, a width of the overwritten track may be narrower than a width of a track that has not been overwritten.

BRIEF DESCRIPTION OF THE DRAWINGS

FIG. 1 is a block diagram illustrating a configuration of a magnetic disk device according to an embodiment;

FIG. 4 is a block diagram illustrating an example of a head positioning control system during write processing according to the embodiment;

FIG. 9 is a diagram illustrating an example of a power spectrum of a feedback residual error and a power cumulative sum of it;

FIG. 10 is a graph illustrating an example of a change of an amplification factor of an offset value when the write ATC on the gain $\beta$ is executed;

FIG. 11 is a graph illustrating an example of a change of a compression ratio of a variation in a read track width when the write ATC on the gain $\beta$ is executed;

FIG. 12 is a flowchart illustrating an example of a write processing method according to the embodiment;

FIG. 13 is a block diagram illustrating an example of a head positioning control system SY1 during the write processing according to a first modification;

FIG. 14 is a block diagram illustrating an example of an adjuster according to the first modification; and FIG. 15 is a graph illustrating an example of a change of a gain with respect to a power ratio according to a second modification.

DETAILED DESCRIPTION

Figure 2:
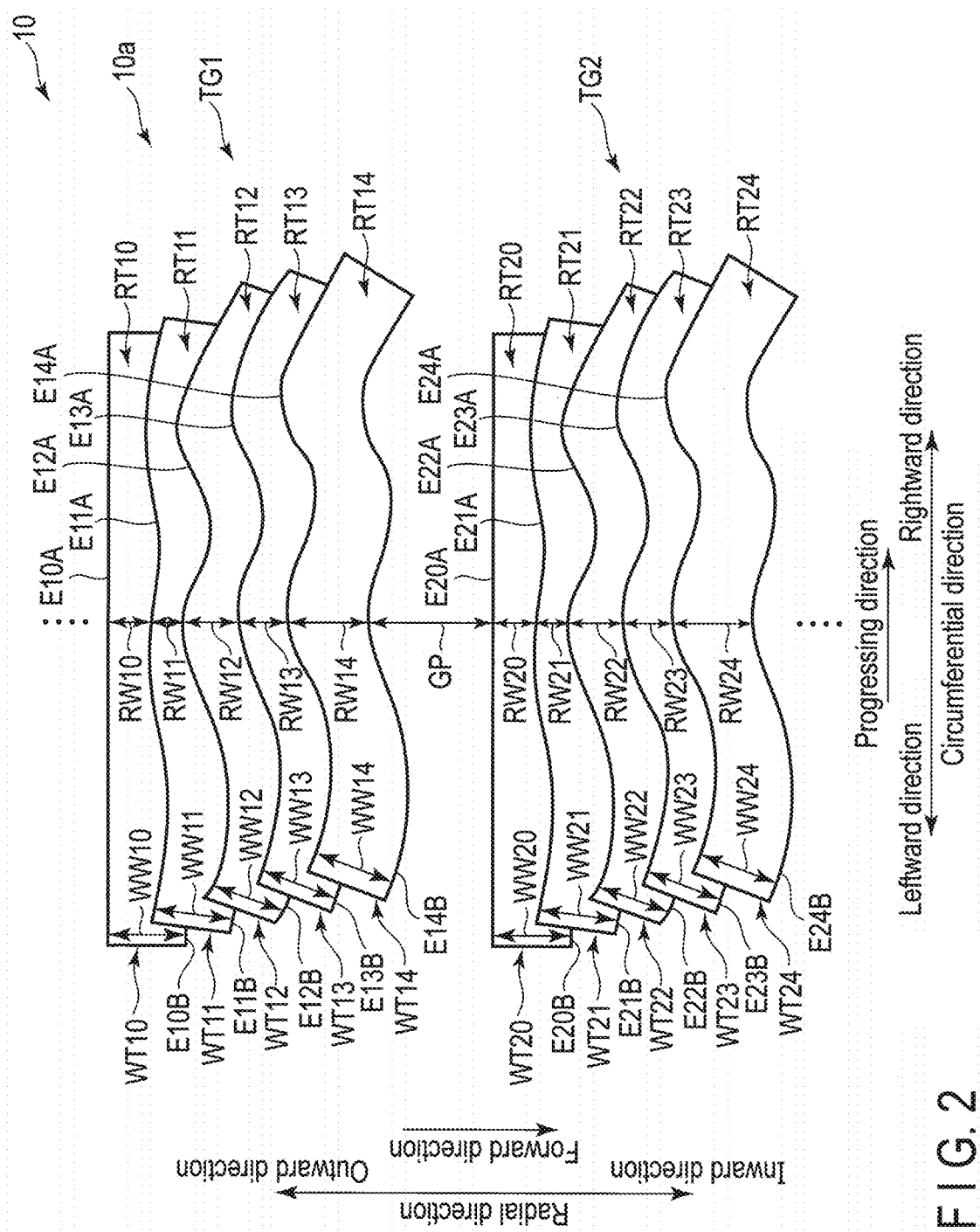
FIG. 2 is a schematic diagram illustrating an example of an SMR region in which data is written.

In general, according to one embodiment, a magnetic disk device comprises: a disk; a head that writes data to the disk and reads data from the disk; and a controller that obtains a gain to be changed according to a first value calculated based on first position information of the head and second position information of the head when writing a first track to the disk, calculates third position information of the head calculated based on the gain and the second position information, and writes a second track adjacent to the first track in a radial direction according to the third position information.

According to another embodiment, a write processing method that is applied to a magnetic disk device comprising a disk and a head that writes data to the disk and reads data from the disk, the write processing method comprises: obtaining a gain to be changed according to a first value calculated based on first position information of the head and second position information of the head when writing a first track to the disk; calculating third position information of the head calculated based on the gain and the second position information; and writing a second track adjacent to the first track in a radial direction according to the third position information.

Embodiments will be described with reference to the drawings hereinafter. Incidentally, the drawings are merely examples and do not limit the scope of the invention.

(Embodiments)

FIG. 1 is a block diagram illustrating a configuration of a magnetic disk device 1 according to an embodiment.

The magnetic disk device 1 includes a head disk assembly (HDA) to be described later, a driver IC 20, a head amplifier integrated circuit (hereinafter, a head amplifier IC or a preamplifier) 30, a volatile memory 70, a buffer memory (buffer) 80, a nonvolatile memory 90, and a system controller 130 which is a single-chip integrated circuit. In addition, the magnetic disk device 1 is connected to a host system (hereinafter simply referred to as a host) 100.

The HDA includes a magnetic disk (hereinafter referred to as a disk) 10, a spindle motor (hereinafter referred to as an SPM) 12, an arm 13 on which a head 15 is mounted, a voice coil motor (hereinafter referred to as a VCM) 14. The disk 10 is attached to the SPM 12 and rotates by drive of the SPM 12. The arm 13 and the VCM 14 constitute an actuator AC. The actuator AC controls movement of the head 15 mounted on the arm 13 to a particular position on the disk 10 by drive of the VCM 14. The number of the disk 10 and the head 15 may be two or more.

In the disk 10, a shingled magnetic recording (SMR) region 10a and a conventional magnetic recording (CMR) region 10b are allocated as data regions. Hereinafter, a direction orthogonal to a radial direction of the disk 10 is referred to as a circumferential direction. The disk 10 has a plurality of servo regions SV each including servo data and the like. The plurality of servo regions SV is radially extended in the radial direction of the disk 10 and is discretely arranged with a particular gap in the circumferential direction. That is, the plurality of servo regions SV is arranged along each track to be written on the disk 10. Hereinafter, the servo region SV in each track is referred to as a servo sector in some cases.

User data or the like that has been requested to be written from the host 100 is recorded in the SMR region 10a. The conventional magnetic recording region 10b can be used as a cache of the SMR region 10a. In the SMR region 10a, a track to be written next is overwritten on a part of a track. Therefore, a track per inch (TPI) of the SMR region 10a is higher than a TPI of the recording region that has not been overwritten. In the SMR region 10a, a plurality of track groups each including a plurality of tracks, which has been continuously overwritten in one direction in the radial direction, is arranged with a gap therebetween. Hereinafter, a track group including a plurality of tracks which has been continuously overwritten in one direction in the radial direction is referred to as a band region. The band region includes at least one track in which a part of a track adjacent thereto in the radial direction (hereinafter referred to as an adjacent track) is overwritten, and a track which has been overwritten last (last track). The last track is not partially overwritten with another track, and thus, has a wider track width than a partially overwritten track. Hereinafter, a track which has been written to the disk 10 is referred to as a write track. The remaining region of the write track except for a region where an adjacent track has been overwritten is referred to as a read track. In addition, the write track may be simply referred to as a track, the read track may be simply referred to as a track, or the write track and the read track may be collectively referred to simply as a track in some cases. A track includes a plurality of sectors. Incidentally, the "track" is used as data extending in the circumferential direction of the disk 10, a region extending in the circumferential direction of the disk 10, and various other meanings. The "sector" is used as a particular region of a track, for example, data written in the sector, a particular region of a track, and various other meanings. In addition, a width in the radial direction of the write track may be referred to as a write track width, and a width in the radial direction of the read track may be referred to as a read track width in some cases. The write track width and the read track width may be collectively referred to as a track width in some cases.

FIG. 2 is a schematic diagram illustrating an example of an SMR region 10a in which data has been written. In FIG. 2, the vertical axis indicates the radial direction of the disk 10, and the horizontal axis indicates the circumferential direction of the disk 10. In the radial direction, a direction toward the center of the disk 10 is referred to as an inward direction, and a direction opposite to the inward direction is referred to as the outward direction. In the radial direction, a direction from an inner diameter to an outer diameter of the disk 10 is defined as the outward direction (outer side), and a direction opposite to the outward direction is defined as an inward direction (inner side). In addition, a direction in which data is written and read is referred to as a forward direction in the radial direction. In the example illustrated in FIG. 2, the forward direction is the same direction as the inward direction. Incidentally, the forward direction may be the same direction as the outward direction. In the circumferential direction, one direction is defined as a rightward direction, and a direction opposite to the rightward direction is defined as a leftward direction. In addition, a direction in which data is written and read in the circumferential direction is referred to as a progressing direction. For example, the progressing direction is a direction opposite to a rotating direction of the disk 10. In the example illustrated in FIG. 2, the progressing direction is the same direction as the rightward direction. Incidentally, the progressing direction may be the same direction as the leftward direction.

In the example illustrated in FIG. 2, the SMR region 10a includes a band region TG1 and a band region TG2. In FIG. 2, each track of the band regions TG1 and TG2 is illustrated in a strip shape extending in one direction for convenience of the description. In practice, each track of the band regions TG1 and TG2 is arranged concentrically with the disk 10. That is, an end in the leftward direction and an end in the rightward direction of each track of the band regions TG1 and TG2 illustrated in FIG. 2 are coincident in practice. In addition, the tracks are misaligned by being affected by a disturbance or other structures in the example illustrated in FIG. 2. Incidentally, the SMR region 10a may include more than two band regions, or may include fewer band regions than two band regions.

The band region TG1 and the band region TG2 are arranged in the radial direction with a gap (or may be referred to as a guard region) GP therebetween. Hereinafter, a configuration of a band region will be described using the band region TG1. A configuration of the band region TG2 is also the same as the configuration of the band region TG1. Therefore, a detailed description of the configuration of the band region TG2 will be omitted.

In the example illustrated in FIG. 2, the band region TG1 includes write tracks WT10, WT11, WT12, WT13, and WT14. The write tracks WT10 and WT11 partially overlap with each other. The write tracks WT11 and WT12 partially overlap with each other. The write tracks WT12 and WT13 partially overlap with each other. The write tracks WT13 and WT14 partially overlap with each other. The write tracks WT10 to WT14 are overwritten in the radial direction in this order in the band region TG1. Each of the write tracks WT10, WT11, WT12, WT13, and WT14 includes a plurality of servo sectors and a plurality of data sectors although not illustrated. Incidentally, the band region TG1 includes five tracks, but may contain fewer tracks than five tracks or may include more tracks than five tracks. The servo sector is also simply referred to as a sector in some cases. The data sector is also simply referred to as a sector in some cases. In addition, the servo sector and the data sector may be collectively referred to as a sector in some cases.

The write track WT10 has a track edge E10A and a track edge E10B. In the example illustrated in FIG. 2, the track edge E10A is an outer end portion of the write track WT10, and the track edge E10B is an inner (forward) end portion of the write track WT10. The write track WT11 has a track edge E11A and a track edge E11B. In the example illustrated in FIG. 2, the track edge E11A is an outer end portion of the write track WT11, and the track edge E11B is an inner (forward) end portion of the write track WT11. The write track WT12 has a track edge E12A and a track edge E12B. In the example illustrated in FIG. 2, the track edge E12A is an outer end portion of the write track WT12, and the track edge E12B is an inner (forward) end portion of the write track WT12. The write track WT13 has a track edge E13A and a track edge E13B. In the example illustrated in FIG. 2, the track edge E13A is an outer end portion of the write track WT13, and the track edge E13B is an inner (forward) end portion of the write track WT13. The write track (final track) WT14 has a track edge E14A and a track edge E14B. In the example illustrated in FIG. 2, the track edge E14A is an outer end portion of the write track WT14, and the track edge E14B is an inner (forward) end portion of the write track WT14.

A write track width WW10 of the write track WT10 is a length in the radial direction between the track edges E10A and E10B. A write track width WW11 of the write track WT11 is a length in the radial direction between the track edges E11A and E11B. A write track width WW12 of the write track WT12 is a length in the radial direction between the track edges E12A and E12B. The write track width WW13 of the write track WT13 is a length in the radial direction between the track edges E13A and E13B. The write track width WW14 of the write track WT14 is a length in the radial direction between the track edges E14A and E14B. The write track widths WW10 to WW14 are, for example, equivalent to each other. Incidentally, the write track widths WW10 to WW14 may be different from each other.

The read track RT10 is the remaining region except for a part of the write track WT10 overwritten with the write track WT11. The read track RT11 is the remaining region except for a part of the write track WT11 overwritten with the write track WT12. The read track RT12 is the remaining region except for a part of the write track WT12 overwritten with the write track WT13. The read track RT13 is the remaining region except for a part of the write track WT13 overwritten with the write track WT14. The read track RT14 corresponds to the write track WT14. The read track RT14 corresponds to the last track in the band region TG1.

A read track width RW10 of the read track RT10 is a length in the radial direction between the track edges E10A and E11A. The read track width RW11 of the read track RT11 is a length in the radial direction between the track edges E11A and E12A. The read track width RW12 of the read track RT12 is a length in the radial direction between the track edges E12A and E13A. The read track width RW13 of the read track RT13 is a length in the radial direction between the track edges E13A and E14A. The read track width RW14 of the read track RT14 is a length in the radial direction between the track edges E14A and E14B. That is, the read track width RW14 is equivalent to the write track width WW14.

In the example illustrated in FIG. 2, the band region TG2 includes write tracks WT20, WT21, WT22, WT23, and WT24. In the band region TG2, the write tracks WT20 to WT24 are overwritten in the radial direction in this order. The write tracks WT20 to WT24 correspond to the write tracks WT10 to WT14 in the band region TG1, respectively.

The write track width WW20 of the write track WT20 is a length in the radial direction between the track edges E20A and E20B. The write track width WW21 of the write track WT21 is a length in the radial direction between the track edges E21A and E21B. The write track width WW22 of the write track WT22 is a length in the radial direction between the track edges E22A and E22B. The write track width WW23 of the write track WT23 is a length in the radial direction between the track edges E23A and E23B. The write track width WW24 of the write track WT24 is a length in the radial direction between the track edges E24A and E24B.

The read track RT20 is the remaining region except for a part of the write track WT20 overwritten with the write track WT21. The read track RT21 is the remaining region except for a part of the write track WT21 overwritten with the write track WT22. The read track RT22 is the remaining region except for a part of the write track WT22 overwritten with the write track WT23. The read track RT23 is the remaining region except for a part of the write track WT23 overwritten with the write track WT24. The read track RT24 corresponds to the write track WT24. The read tracks RT20 to RT24 correspond to the read tracks RT10 to RT14 in the band region TG1, respectively.

The read track width RW20 of the read track RT20 is a length in the radial direction between the track edges E20A and E21A. The read track width RW21 of the read track RT21 is a length in the radial direction between the track edges E21A and E22A. The read track width RW22 of the read track RT22 is a length in the radial direction between the track edges E22A and E23A. The read track width RW23 of the read track RT23 is a length in the radial direction between the track edges E23A and E24A. The read track width RW24 of the read track RT24 is a length in the radial direction between the track edges E24A and E24B.

The head 15 includes a write head 15W and a read head 15R mounted on a slider serving as the main body. The write head 15W writes data on the disk 10. The read head 15R reads the data recorded on the disk 10. Incidentally, the write head 15W may be simply referred to as the head 15, the read head 15R may be simply referred to as the head 15, or the write head 15W and the read head 15R may be collectively referred to as a head 15 in some cases.

The driver IC 20 controls the drive of the SPM 12 and the VCM 14 according to control of the system controller 130 (specifically, an MPU 60 to be described later).

The head amplifier IC (preamplifier) 30 includes a read amplifier and a write driver. The read amplifier amplifies a read signal read from the disk 10 by the read head 15R and outputs the amplified read signal to the system controller 130 (specifically, a read/write (R/W) channel 40 to be described later). The write driver outputs a write current corresponding to a signal output from the R/W channel 40 to the write head 15W.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The buffer memory 80 is a semiconductor memory that temporarily records data and the like to be transmitted and received between the magnetic disk device 1 and the host 100. Incidentally, the buffer memory 80 may be formed integrally with the volatile memory 70. The buffer memory 80 is, for example, a DRAM, a static random access memory (SRAM), an SDRAM, a ferroelectric random access memory (FeRAM), a magnetoresistive random access memory (MRAM), or the like.

The nonvolatile memory 90 is a semiconductor memory that records stored data even when power supply is cut off. The nonvolatile memory 90 is, for example, a NOR type or a NAND type flash read only memory (FROM).

The system controller (controller) 130 is realized using a large-scale integrated circuit (LSI) called a System-on-a-Chip (SoC) in which a plurality of elements is integrated on a single chip, for example. The system controller 130 includes the read/write (R/W) channel 40, a hard disk controller (HDC) 50, the microprocessor (MPU) 60, and the like. The system controller 130 is electrically connected to, for example, the driver IC 20, the head amplifier IC 30, the volatile memory 70, the buffer memory 80, the nonvolatile memory 90, the host system 100, and the like.

The R/W channel 40 executes signal processing of read data transferred from the disk 10 to the host 100 and write data transferred from the host 100 in response to an instruction from the MPU 60 to be described later. The R/W channel 40 has a circuit or a function to measure signal quality of the read data. The R/W channel 40 is electrically connected to the head amplifier IC 30, the HDC 50, the MPU 60, and the like, for example.

The HDC 50 controls data transfer between the host 100 and the R/W channel 40 in response to an instruction from the MPU 60 to be described later. The HDC 50 is electrically connected to, for example, the R/W channel 40, the MPU 60, the volatile memory 70, the buffer memory 80, the nonvolatile memory 90, and the like.

The MPU 60 is a main controller that controls each unit of the magnetic disk device 1. The MPU 60 controls the VCM 14 via the driver IC 20 and executes servo control for positioning the head 15. The MPU 60 also controls the SPM 12 via the driver IC 20 to rotate the disk 10. The MPU 60 controls a write operation of data to the disk 10 and selects a storage destination of the write data. In addition, the MPU 60 controls a read operation of data from the disk 10 and controls processing of the read data. The MPU 60 is connected to each unit of the magnetic disk device 1. The MPU 60 is electrically connected to the driver IC 20, the R/W channel 40, the HDC 50, and the like, for example.

The MPU 60 includes a read/write controller 61. The MPU 60 executes processing of each unit, for example, the read/write controller 61 and the like, on firmware. Incidentally, the MPU 60 may include each unit, for example, the read/write controller 61 as a circuit.

The read/write controller 61 controls data read processing and write processing according to a command from the host 100. The read/write controller 61 controls the VCM 14 via the driver IC 20 to position the head 15 at a particular position on the disk 10 and read or write data. In the case of SMR, the read/write controller 61 sequentially writes data, for example, in a particular band region. In the case of reading the particular band region, the read/write controller 61 sequentially reads data, for example. The read/write controller 61 includes a seek controller 611 and a positioning controller 612. Hereinafter, "positioning or arranging the head 15 (the write head 15W or the read head 15R) at a particular position" may also indicate "positioning or arranging the central portion of the head 15 (the write head 15W or the read head 15R) at a particular position" in some cases.

The seek controller 611 moves the head 15 to a particular position on the disk 10, for example, a particular position in the radial direction (hereinafter, referred to as a radial position) of a particular position in the circumferential direction (hereinafter referred to as a circumferential position). In one example, the seek controller 611 moves the head 15 to a particular sector of a particular track on the disk 10.

The positioning controller 612 controls the positioning of the head 15 to a target radial position (hereinafter referred to as a target position) during the read processing and the write processing in each track. The positioning controller 612 executes the positioning control of the head 15 by sampling interrupt control in units of servo sectors. For example, the positioning controller 612 controls the head 15 so as to follow a path serving as a target (hereinafter referred to as a target path) during the read processing and the write processing in each track. Here, a path of the head 15 corresponds to, for example, the radial position of the head 15 at each circumferential position of a particular track. Incidentally, the radial position may be used as the meaning of the path, and the path may be used as the radial position in some cases. Hereinafter, a radial position of the head 15, for example, the write head 15W or the read head 15R, during the write processing is referred to as a write position, and a radial position of the head 15, for example, a read head 15R during the read processing is referred to as a read position. A path of the head 15 during the write processing is referred to as a write path, and a path of the head 15 during the read processing is referred to as a read path. A target position of the head 15 during the write processing is referred to as a target write position and a target position of the head 15 during the read processing is referred to as a target read position. In addition, a target path of the head 15 during the write processing is referred to as a target write path, and a target path of the head 15 during the read processing is referred to as a target read path.

In one example, the positioning controller 612 positions the head 15, for example, the write head 15W to a target write position (hereinafter referred to as an initial write position) corresponding to a radial position of a central portion of the write track (hereinafter referred to as an initial write track) written concentrically to the disk 10 during the write processing. In other words, the positioning controller 612 controls the head 15, for example, the write head 15W so as to follow a target write path (hereinafter referred to as an initial write path) passing through the central portion in the radial direction of the initial write track during the write processing.

In addition, the positioning controller 612 positions the head 15, for example, the read head 15R at a normal target read position (hereinafter referred to as an initial read position) corresponding to a radial position of a central portion of a remaining read track (hereinafter referred to as an initial read track) of the write track that has been written to the initial write position (initial write path) except for a part where the write track adjacent in the forward direction has been overwritten, the write track written to the initial write position (initial write path), for example, during the read processing. In other words, the positioning controller 612 controls the head 15, for example, the read head 15R so as to follow a target read path (hereinafter referred to as an initial read path) passing through the central portion in the radial direction of the initial read track during the read processing.

The positioning controller 612 acquires information (hereinafter simply referred to as position information) related to the position of the head 15, for example, the write head 15W (or the read head 15R) during the write processing. Hereinafter, the position information of the head 15 during the write processing is referred to as write position information. The write position information includes information related to the radial position of the head 15 at each circumferential position during the write processing, that is, information related to a path of the head 15 during the write processing (hereinafter referred to as write path information), a difference value (hereinafter also referred to as an offset value in some cases) between an initial write position at each circumferential position and a current (or actual) write position (hereinafter referred to as an actual write position), a difference value (hereinafter also referred to as a write error) between the target write position and the actual write position at each circumferential position, and the like. The offset value corresponds to, for example, a position error which is a relative displacement between a position of a center of the head 15 and a position of a center of a particular track. The difference value between the initial write path and the actual write path may be referred to as the offset value in some cases. In addition, the difference value between the target write path and the actual write path may be referred to as the write error in some cases. Hereinafter, a difference value between the target read position and a current read position (hereinafter referred to as an actual read position) may be referred to as a read error. A difference value between the target read path and an actual read path may be referred to as the read error in some cases. The positioning controller 612 records the acquired write position information in a particular recording region, for example, the disk 10, the volatile memory 70, the buffer memory 80, the nonvolatile memory 90, or the like.

The positioning controller 612 can execute the positioning control based on the position information. Hereinafter, controlling the head 15 so as to follow a current target position and a current target path generated based on the position information may be referred to as an adaptive track center (ATC) or automatic track width control (ATC) control. For example, based on write position information (hereinafter referred to as previous write position information) corresponding to a write track (hereinafter referred to as a previous write track or a previous track) that has been written immediately before a write track that is being currently written (hereinafter referred to as a current write track or a current track), the positioning controller 612 generates a target write position (hereinafter referred to as a current target write position) and a target write path (hereinafter referred to as a current target write path) in the current write track, and controls the write head 15W based on the generated current target write position and the current target write path. Hereinafter, to control the head 15, for example, the write head 15W based on the current target write position and the current target write path generated based on the previous write position information may be referred to as write ATC in some cases. In addition, based on write position information (hereinafter referred to as next write position information) corresponding to a read track (hereinafter referred to as a next read track) positioned (adjacent) immediately before a read track that is being currently read lead track (hereinafter referred to as a current read track or a current track) in the forward direction or a write track (hereinafter referred to as a next write track) and write position information (hereinafter referred to as current write position information) corresponding to the current read track (current write track), for example, the positioning controller 612 generates a target read position (hereinafter referred to as a current target read position) and a target read path (hereinafter referred to as a current target read path) in the current read track and controls the read head 15R based on the generated current target read position and current target read path. Hereinafter, to control the head 15, for example, the read head 15R, for example, based on the current target read position and the current target read path generated based on the next write position information and the current write position information may be referred to as read ATC in some cases. Hereinafter, a sector that is being currently written or read is referred to as a current sector, and a sector positioned in the progressing direction of the current sector, for example, the sector positioned immediately before the current sector is referred to as a next sector.

Figure 3:
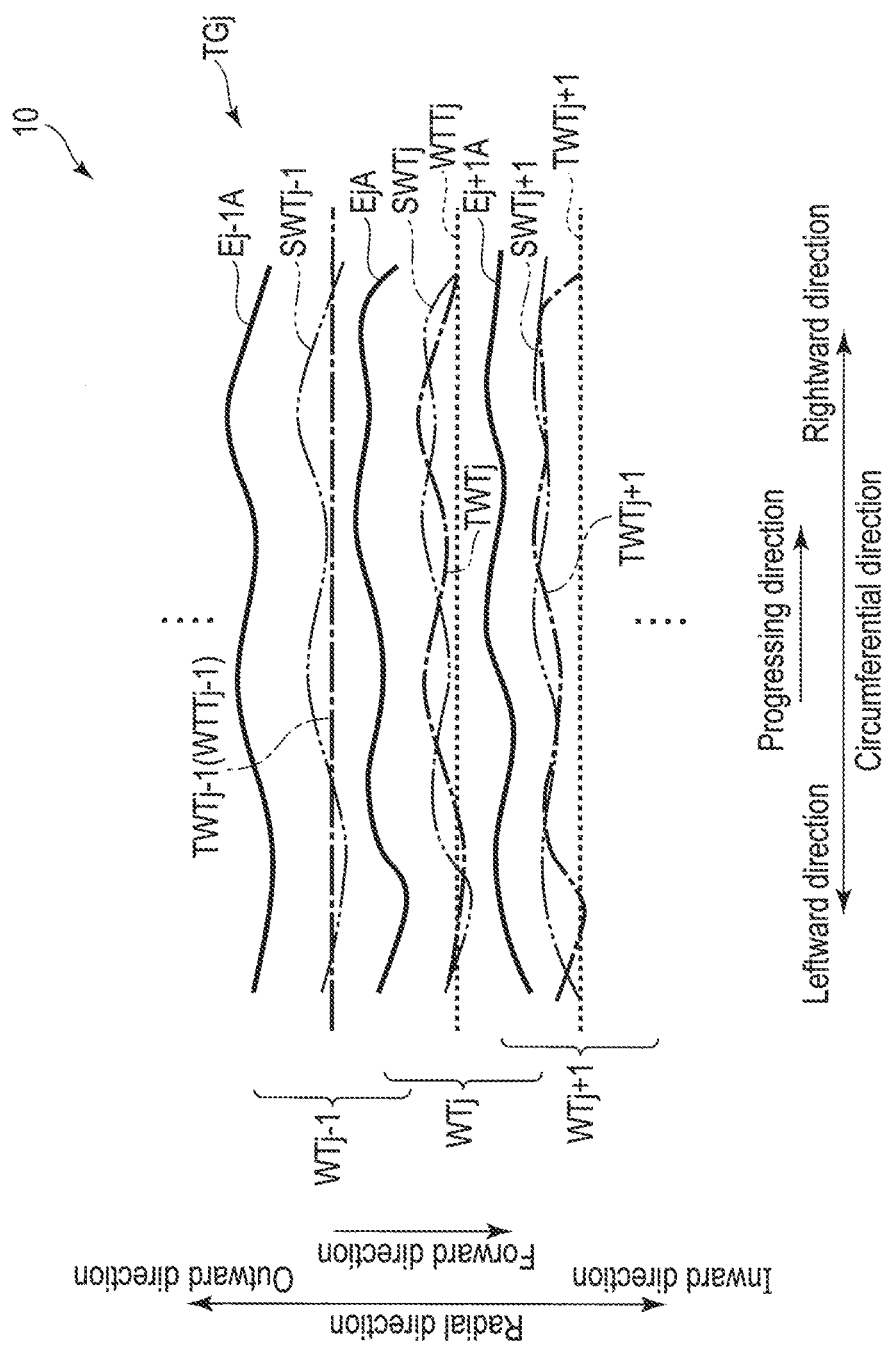
FIG. 3 is a schematic diagram illustrating an example of write ATC.

FIG. 3 is a schematic diagram illustrating an example of the write ATC. In the example illustrated in FIG. 3, a band region TGj includes write tracks WTj−1, WTj, and WTj+1. In the band region TGj, the write tracks WTj−1 to WTj+1 are overwritten in this order in the forward direction. The write track WTj−1 has a track edge Ej−1A. In the example illustrated in FIG. 3, the track edge Ej−1A is an end portion in the outward direction of the write track WTj−1. FIG. 3 illustrates an initial write path WTTj−1 corresponding to the write track WTj−1. The write track WTj has a track edge Ej. In the example illustrated in FIG. 3, a track edge EjA is an end portion in the outward irection of the write track WTj. FIG. 3 illustrates an initial write path WTTj corresponding to the write track WTj. The write track WTj+1 has a track edge Ej+1A. In the example illustrated in FIG. 3, the track edge Ej+1A is an end portion of the write track WTj+1 in the outward direction. FIG. 3 illustrates an initial write path WTTj+1 corresponding to the write track WTj+1.

The positioning controller 612 controls positioning of the write head 15W so as to follow a target write path TWTj−1 at the time of writing the write track WTj−1. The target write path TWTj−1 corresponds to the initial write path WTTj−1. In practice, the write head 15W runs on a practical write path (hereinafter referred to as an actual write path) SWTj−1 including a write error when writing the write track WTj−1. The positioning controller 612 acquires, for example, write path information of the head 15, for example, the write head 15W during the write processing corresponding to the actual write path SWTj−1, and records the acquired write path information in a particular recording region, for example, the disk 10, the volatile memory 70, the buffer memory 80, the nonvolatile memory 90, or the like.

Based on the write path information corresponding to the actual write path SWTj−1, the positioning controller 612 generates a target write path TWTj at the time of writing the write track WTj and controls positioning of the write head 15W so as to follow the target write path TWTj. In practice, the write head 15W runs on an actual write path SWTj when writing the write track WTj. The positioning controller 612 acquires, for example, write path information corresponding to the actual write path SWTj, and records the acquired write path information in a particular recording region, for example, the disk 10, the volatile memory 70, the buffer memory 80, the nonvolatile memory 90, or the like.

Based on the write path information corresponding to the actual write path SWTj, the positioning controller 612 generates a target write path TWTj+1 at the time of writing the write track WTj+1 and controls positioning of the write head 15W so as to follow the target write path TWTj+1. In practice, the write head 15W runs on an actual write path SWTj+1 when writing the write track WTj+1. The positioning controller 612 acquires, for example, write path information corresponding to the actual write path SWTj+1, and records the acquired write path information in a particular recording region, for example, the disk 10, the volatile memory 70, the buffer memory 80, the nonvolatile memory 90, or the like.

FIG. 4 is a block diagram illustrating an example of a positioning control system SY1 of the head 15 during write processing according to the embodiment.

The magnetic disk device 1 includes the positioning control system (hereinafter referred to as a write control system) SY1 for the head 15 during the write processing. The write control system SY1 includes a converter S1, a controller S2, an actuator S3, a memory S4, a storage region S5, an adjuster S6, a variable gain amplifier (VGA) S7, a delayer S8, and calculation units CL1, CL2, and CL3. Hereinafter, the variable gain amplifier (VGA) S7 is simply referred to as a variable gain S7. The converter S1, the controller S2, the adjuster S6, the variable gain S7, the delayer S8, the calculation unit CL1, the calculation unit CL2, and the calculation unit CL3 are included in the system controller 130, for example.

The actuator S3 is included in the actuator AC, for example. The memory S4 is included in, for example, the volatile memory 70, the buffer memory 80, or the nonvolatile memory 90. The storage region S5 is included in, for example, the disk 10, the volatile memory 70, the buffer memory 80, or the nonvolatile memory 90. The calculation unit CL2, the controller S2, and the actuator S3 constitute a feedback system FS. In FIG. 4, each of a position (C, H) in the radial direction of a particular head, for example, the head 15 in a particular track (cylinder) of the disk 10, a sector (C, S) of a particular track of the disk 10, an initial write position X1w, a target write position Xw, a write position error ew, a write positioning drive amount Uw, a write position correction value X2w, an offset value X3w, and a power spectrum of a particular frequency band of the offset value X3w relative to a cumulative square sum (hereinafter simply referred to as a power cumulative sum) of the power spectrum of the entire frequency band of the offset value X3w, for example, a power spectrum of the entire frequency band, for example, a ratio (hereinafter referred to as a power ratio) γ of a power cumulative sum of the particular frequency band is processed as a signal (or information) in the write control system SY1. The offset value X3w corresponds to a position error signal (PES). The power ratio γ is, for example, a ratio of the power cumulative sum of a frequency band (hereinafter also referred to as an ATC band) of the offset value (PES) X3w that can follow the current write position and the current target write path generated based on the previous write position information by the write ATC relative to the power cumulative sum of the entire frequency band of the offset value (PES) X3w. The power ratio γ may be referred to as a PES power ratio γ in some cases. Incidentally, the power ratio γ may be a ratio of a cumulative square sum of a power spectrum of a frequency band narrower than a particular frequency band of the offset value X3w relative to a cumulative square sum of a power spectrum of the particular frequency band of the offset value X3w.

The converter S1 converts a physical position (hereinafter referred to as a physical position), which corresponds to a logical position (hereinafter referred to as a logical position) of the disk 10 designated by a host device, for example, the host 100, to a radial position of the disk 10. The logical position may be, for example, a logical block address (LBA), and the physical position may be, for example, a servo information array indicating the physical position of the disk 10. For example, the converter S1 converts a combination (C, H) (a position of the head 15 in the radial direction) of a particular head H, for example, the head 15 from a servo information array (C: track or cylinder, H: head, S: sector) corresponding to an LBA designated from the host 100 and a track C among a plurality of concentric circular tracks of the disk 10 for positioning the head H, to the initial write position X1w.

The controller S2 controls the actuator S3. The controller S2 generates the drive amount (hereinafter referred to as the write drive amount) Uw of the head 15 during the write processing of the actuator S3, for example, based on the write position error ew which is a difference value between the target write position Xw and an actual write position Yw. Incidentally, the controller S2 may generate the write positioning drive amount Uw based on a value other than the write position error ew.

The actuator S3 is driven in accordance with an output of the controller S2. The actuator S3 is driven, for example, based on the write positioning drive amount Uw, and moves the head 15 to the actual write position Yw.

The memory S4 has a table TB. The table TB includes write position information and the like.

The adjuster S6 adjusts the variable gain S7. For example, the adjuster S6 generates the power ratio γ for adjusting the variable gain S7 based on the offset value X3w which is the difference value between the initial write position X1w and the actual write position Yw.

The variable gain S7 generates the write position correction value X2w based on a gain R that can be changed to an optimum value. The gain R is, for example, a coefficient configured to adjust the followability of a current track with respect to a previous track in the ATC. For example, the variable gain S7 generates a write position correction value X2w (C, S+1) corresponding to a next sector (C, S+1) positioned in the progressing direction of a current sector (C, S) based on the gain β set according to the power ratio γ and the offset value X3w corresponding to a next sector (C−1, S+1) positioned in the progressing direction of a sector (C−1, S) of a previous write track adjacent to the current sector (C, S) of the current write track.

The delayer S8 performs delay by a particular period. The delayer S8, for example, delays the write position correction value X2w (C, S+1) by one sampling period.

When the logical position of the disk 10 on which data is to be written, for example, the LBA is designated by the host device, for example, the host 100, the write control system SY1 converts the LBA to the physical position (C, H, S) in advance, and outputs the position (C, H) of the head 15 in the radial direction to the converter S1, and outputs the current sector (C, S) to the memory S4. The position (C, H) is input to the converter S1. The converter S1 converts the position (C, H) to the initial write position X1w and outputs the initial write position X1w to the calculation units CL1 and CL3. The initial write position X1w and a write position correction value X2w (C, S) are input to the calculation unit CL1. The calculation unit CL1 generates the target write position Xw by adding the write position correction value X2w (C, S) to the initial write position X1w, and outputs the generated target write position Xw to the calculation unit CL2. In other words, the calculation unit CL1 outputs the generated target write position Xw to the feedback system FS.

The calculation unit CL2 outputs the write position error ew, which is a difference value between the target write position Xw and the actual write position Yw, to the controller S2. The write position error ew corresponds to the following accuracy of the output (actual write position Yw) with respect to the input (target write position Xw) of the feedback system FS. The write position error ew may be referred to as a feedback residual error ε (=Yw−Xw=ew) in some cases. The distribution of the feedback residual error ε in the circumferential direction of a particular track is influenced by characteristics of the feedback system FS, the disturbance input to the write control system SY1, and the like. The write position error ew is input to the controller S2. The controller S2 outputs the write positioning drive amount Uw to the actuator S3. The write positioning drive amount Uw is input to the actuator S3. The actuator S3 is driven according to the write positioning drive amount Uw and moves the head 15, for example, the write head 15W to the actual write position Yw corresponding to the write positioning drive amount Uw. The actuator S3 outputs the actual write position Yw to the calculation units CL2 and CL3. In other words, the feedback system FS outputs the actual write position Yw to the calculation units CL2 and CL3. The feedback system FS makes the actual write position Yw stably follow the target write position Xw.

The write control system SY1 drives the actuator S3 based on the write position error ew to position the head 15 on the target track (C, H) of the disk 10, and reads the servo information recorded on the disk 10 to detect the actual write position Yw. The write control system SY1 detects the sector S and confirms that the head 15 is positioned at a target sector (C, H, S). When it is determined that the head 15 is positioned at the target sector (C, H, S), the write control system SY1 writes data to this sector (C, H, S). The write control system SY1 receives the LBA corresponding to the particular position of the disk 10 designated by the host 100, positions the head H corresponding to this LBA, for example, the head 15 at the track C, and sequentially writes data to the sector S along the progressing direction by the head 15 in accordance with the rotation of the disk 10. The write control system SY1 sequentially writes data by repeating such processing.

The calculation unit CL3 outputs an offset value $X3w$ (C, S) which is a difference value between the actual write position Yw and the initial write position $X1w$ to the memory S4 and the adjuster S6. The logical position (C, S) and the offset value $X3w$ (C, S) are input to the memory S4. In the memory S4, the write position information including the offset value $X3w$ associated with the logical position (C, S) is recorded as a table. When write position information in all tracks of a particular band region is recorded, the memory S4 writes the write position information in all the tracks of the particular band region in the storage region S5 in association with this particular band region. The memory S4 outputs an offset value $X3w$ (C−1, S+1) of the sector (C−1, S+1), adjacent in a direction opposite to the progressing direction of the next sector (C, S+1) positioned in the progressing direction of the sector (C, S) corresponding to the position (C, S), to the variable gain S7. The offset value $X3w$ is input to the adjuster S6. The adjuster S6 outputs the power ratio γ generated based on the offset value $X3w$ to the variable gain S7. The offset value $X3w$ (C−1, S+1) and the power ratio γ are input to the variable gain S7. The variable gain S7 outputs the write position correction value $X2w$ (C, S+1) obtained by multiplying the offset value $X3w$ (C−1, S+1) by the gain (set according to the power ratio γ to the delayer S8. The write position correction value $X2w$ (C, S+1) is input to the delayer S8. The delayer S8 outputs the write position correction value $X2w$ (C, S) obtained by delaying the write position correction value $X2w$ by one sampling period to the calculation unit CL1.

When executing the write ATC, the write control system SY1 corrects the position of the head 15 based on the previous write position information in order to make a track width between two adjacent tracks in the radial direction, for example, a read track width constant For example, when writing data to the sector (C, H, S), the write control system SY1 corrects the position of the head 15 in the sector (C, H, S) based on the previous write position information when data has been written to a sector (C−1, H, S) of a previous write track adjacent in the radial direction of the sector (C, H, S). The write control system SY1 can maintain the track width between the sector (C, H, S) and the sector (C−1, H, S) to be constant by correcting the position of the head 15 in this manner. The write control system SY1 records an offset value (PES) $X3w$, which is a relative value of the actual write position Yw with respect to the initial write position $X1w$, as a table TB in the memory S4 in order to refer to the write position information in the previous write track. The write control system SY1 refers to the offset value $X3w$ of the previous write track recorded in the table TB and multiplies the offset value $X3w$ of the previous write track by the gain β, thereby generating the write position correction value $X2w$. For example, when writing data to the sector (C, H, S), the write control system SY1 refers to the offset value $X3w$ (C−1, S) of the previous write track from the table TB to calculate the write position correction value $X2w$ by multiplying the offset value $X3w$ of the previous write track by the gain β, and corrects the initial write position $X1w$ based on the calculated write position correction value $X2w$. At this time, the write control system SY1 may record the offset value $X3w$ (C, S) in the table TB. In addition, the write control system SY1 may record the offset value $X3w$ of the next sector (S+1) in the table TB. In this case, the write control system SY1 refers to the offset value $X3w$ (C−1, S+1) to calculate the write position correction value $X2w$ of a next sector (C, H, S+1), and calculates the write position correction value $X2w$ of the sectors (C, H, S) by delaying the write position correction value $X2w$ by one sample period.

Figure 5:
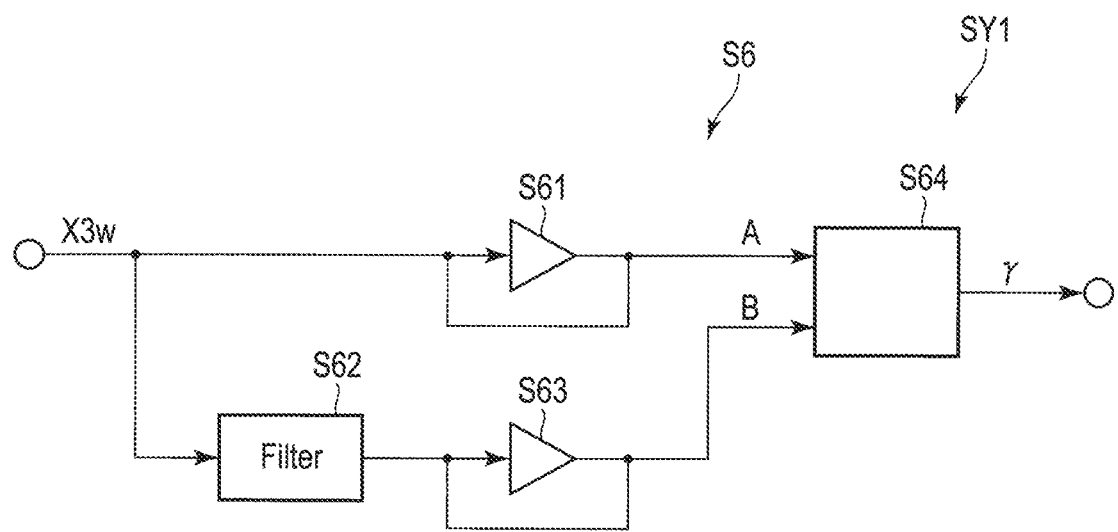
FIG. 5 is a block diagram illustrating an example of an adjuster according to the embodiment.

FIG. 5 is a block diagram illustrating an example of the adjuster S6 according to the present embodiment.

The adjuster S6 has cumulative sum calculators S61 and S63, a filter S62, and a divider S64.

The cumulative sum calculators S61 and S63 calculate a cumulative square sum (for example, a power cumulative sum) of a particular time. The cumulative sum calculator S61 calculates a cumulative square sum A within a particular time based on the offset value $X3w$ (PES), for example. In one example, the cumulative sum calculator S61 calculates a power cumulative sum each time a particular sector offset value $X3w$ of a particular track is input. The cumulative sum calculator S61 counts a count value each time the offset value $X3w$ is input. For example, the cumulative sum calculator S61 increments the count value one by one each time the power cumulative sum is calculated. When the count value reaches a threshold (hereinafter referred to as a count threshold), the cumulative sum calculator S61 outputs the calculated power cumulative sum. The count threshold is, for example, the number of servo samples for one round of a particular track of the disk 10. Incidentally, the count threshold may be, for example, the number of servo samples for a half round, two rounds or three rounds of a particular track of the disk 10. The cumulative sum calculator S63 calculates a cumulative square sum B within a particular time based on the offset value $X3w$ (PES) obtained by suppressing a specific frequency component by the filter S62, for example. In one example, the cumulative sum calculator S63 calculates a power cumulative sum each time (a signal of) the offset value $X3w$ obtained by suppressing the specific frequency component of a particular sector is input. The cumulative sum calculator S63 counts a count value each time the power cumulative sum is calculated. For example, the cumulative sum calculator S63 increments the count value one by one each time the power cumulative sum is calculated. When the count value reaches the count threshold, the cumulative sum calculator S63 outputs the calculated power cumulative sum.

The filter S62 suppresses the specific frequency component of the input signal. The filter S62 is, for example, a low-pass filter (LPF), and passes a frequency component having a frequency equal to or lower than a particular frequency, for example, a frequency component having a low frequency (hereinafter referred to as a low frequency component), thereby suppressing a frequency component having a frequency higher than a particular frequency, for example, a frequency component having a high frequency (hereinafter referred to as a high frequency component). The high frequency component is, for example, a frequency component having a frequency higher than a frequency of the low frequency component.

The divider S64 calculates the power ratio γ. The divider S64 calculates the power ratio γ by dividing the cumulative square sum B by the cumulative square sum A, for example.

The offset value $X3w$ is input to the cumulative sum calculator S61. The cumulative sum calculator S61 outputs the cumulative square sum A calculated based on the offset value $X3w$ to the divider S64. The offset value $X3w$ is input to the filter S62. The filter S62 outputs the offset value $X3w$, obtained by suppressing the frequency component having a frequency larger than a particular frequency, to the cumulative sum calculator S63. The offset value X3w, obtained by suppressing the frequency component having the frequency larger than the particular frequency, is input to the cumulative sum calculator S63. The cumulative sum calculator S63 outputs the cumulative square sum B calculated based on the offset value X3w, obtained by suppressing the frequency component having the frequency larger than the particular frequency, to the divider S64. The divider S64 outputs the power ratio γ calculated based on the cumulative square sum A and the cumulative square sum B.

Figure 6:
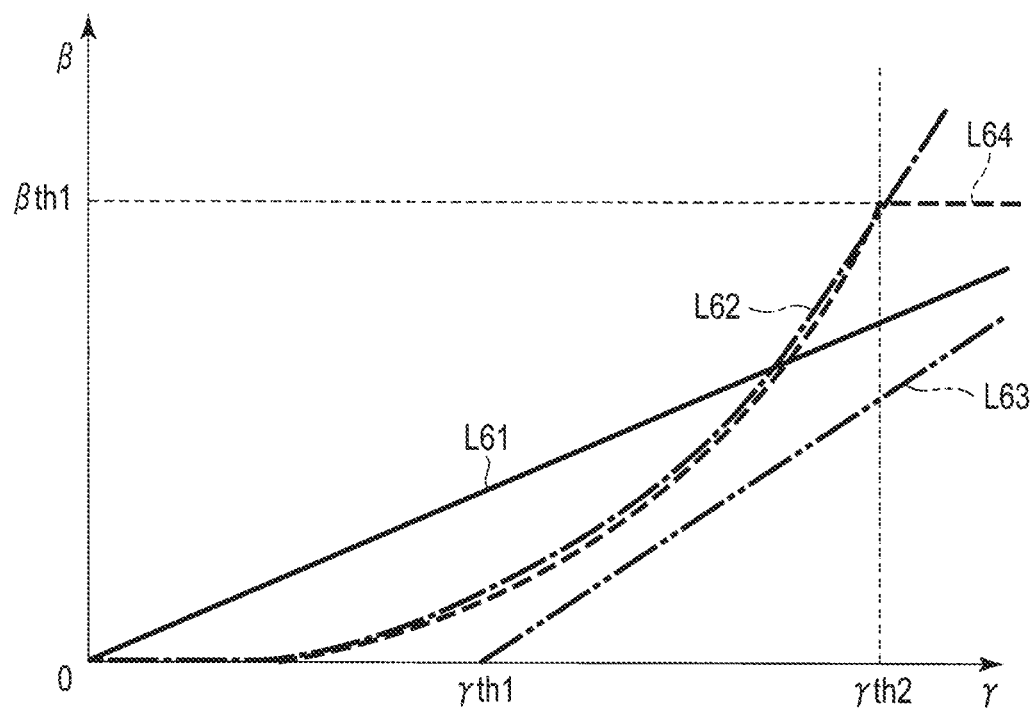
FIG. 6 is a graph illustrating an example of a change of a gain $\beta$ with respect to a power ratio $\gamma$ according to the embodiment.

FIG. 6 is a graph illustrating an example of a change of the gain β with respect to the power ratio γ according to the present embodiment. In FIG. 6, the vertical axis represents the gain β, and the horizontal axis represents the power ratio γ. FIG. 6 illustrates thresholds βth1, γth1, and γth2. Hereinafter, the threshold βth1 may be referred to as a gain threshold, and the thresholds γth1 and γth2 may be referred to as a power ratio threshold in some cases. FIG. 6 illustrates a solid line L61, a one-dot chain line L62, a two-dot chain line L63, and a broken line L64. The solid line L61 indicates the gain β proportional to the power ratio γ. The one-dot chain line L62 indicates the gain β which changes exponentially with respect to the power ratio γ. The two-dot chain line L63 indicates the gain β which is zero at the power ratio γ lower than the power ratio threshold γth1 and is proportional to the power ratio γ equal to or higher than the power ratio threshold γth1. The broken line L64 indicates the gain R which increases exponentially at the power ratio γ lower than the power ratio threshold γth2 and is the gain threshold βth1 at the power ratio γ equal to or higher than the power ratio threshold γth2.

The magnetic disk device 1 continuously changes the gain β with respect to the power ratio γ as indicated by the solid line L61, the one-dot chain line L62, the two-dot chain line L63, or the broken line L64, for example. Incidentally, the magnetic disk device 1 may continuously change the gain β with respect to the power ratio γ in a manner other than the example illustrated in FIG. 6.

Figure 7:
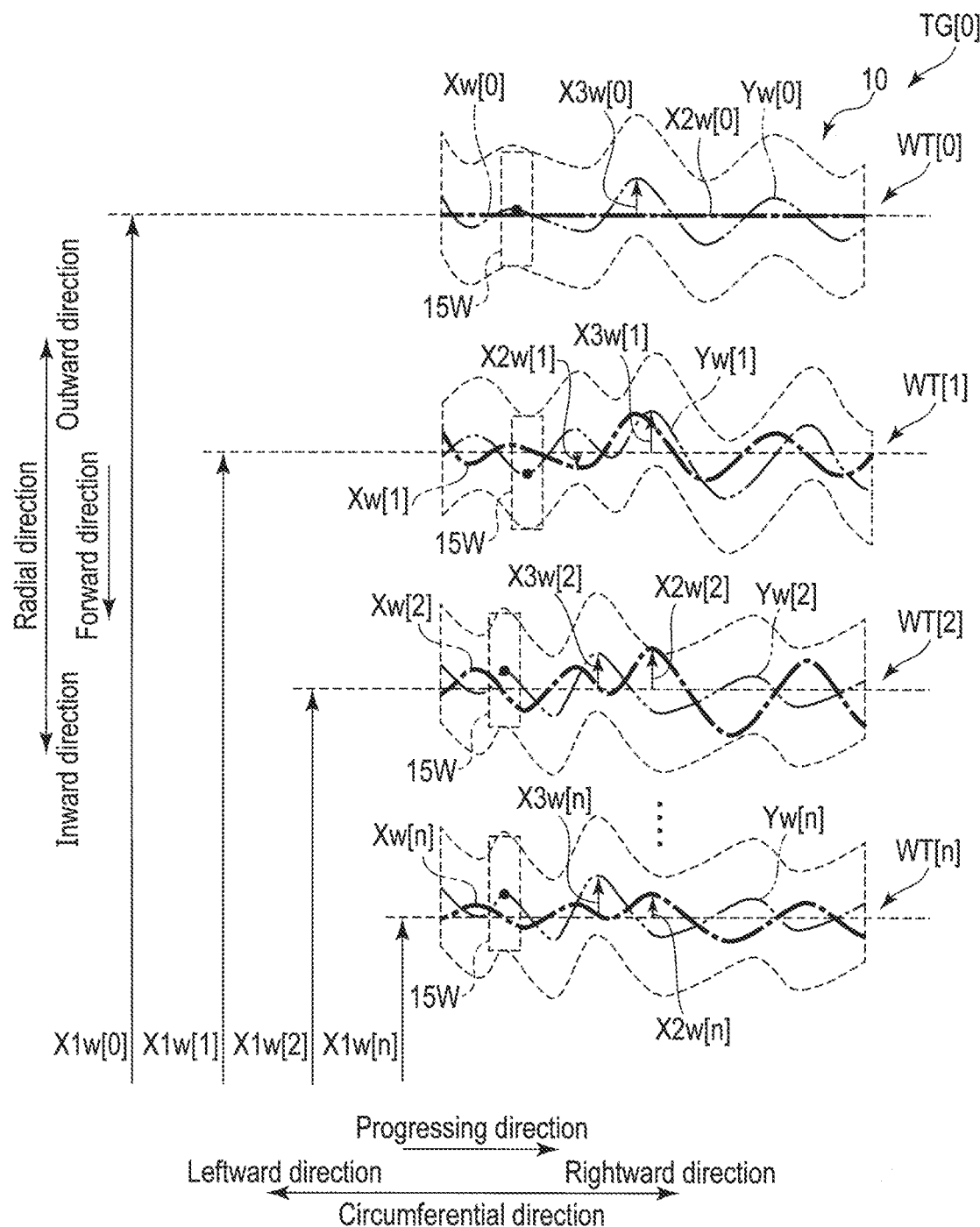
FIG. 7 is a schematic diagram illustrating an example of a processing method of the write ATC.

FIG. 7 is a schematic diagram illustrating an example of a processing method of the write ATC. In the example illustrated in FIG. 7, a band region TG[0] includes write tracks WT[0], WT[1], WT[2], . . . , and WT[n]. Here, n is an integer of zero or larger, for example. In the example illustrated in FIG. 7, n is an integer larger than two, for example. Although the write tracks WT[0] to WT[n] are illustrated separately for convenience of the description in the example illustrated in FIG. 7, the write tracks WT[0] to WT[n] are actually overwritten in the forward direction in this order.

FIG. 7 illustrates an initial write path X1w[0] of the write track WT[0], a write position correction value X2w[0] for the initial write path X1w[0], an offset value X3w[0] of the write track WT[0], a target write path Xw[0] at the time of writing the write track WT[0], and an actual write path Yw[0] at the time of writing the write track WT[0]. In the example illustrated in FIG. 7, the target write path Xw[O] corresponds to the initial write path X1w[0]. FIG. 7 illustrates an initial write path X1w[1] of the write track WT[1], a write position correction value X2w[1] for the initial write path X1w[1], an offset value X3w[1] of the write track WT[1], a target write path Xw[1] at the time of writing the write track WT[1], and an actual write path Yw[1] at the time of writing the write track WT[1]. FIG. 7 illustrates an initial write path X1w[2] of the write track WT[2], a write position correction value X2w[2] for the initial write path X1w[2], an offset value X3w[2] of the write track WT[2], a target write path Xw[2] at the time of writing the write track WT[2], and an actual write path Yw[2] at the time of writing the write track WT[2]. FIG. 7 illustrates an initial write path X1w[n] of the write track WT[n], a write position correction value X2w[n] for the initial write path X1w[n], an offset value X3w[n] of the write track WT[n], a target write path Xw[n] at the time of writing the write track WT[n], and an actual write path Yw[n] at the time of writing the write track WT[n].

In the example illustrated in FIG. 7, the magnetic disk device 1 controls positioning of the write head 15W so as to follow the target write path Xw[0] at the time of writing the write track WT[0]. In practice, the write head 15W runs on an actual write path Yw[0] when writing the write track WT[0]. The actual write path Yw[0] is expressed by the following formula.

$$Yw[0] = X1w[0] + X3w[0] = X1w[0] + X2w[0] + \varepsilon[0] \quad (1)$$

Here, ε[0] is a feedback residual error E in the write track WT[0]. In addition, X2w[0] is zero because no previous track is written. Therefore, Formula (1) is expressed by the following formula.

$$Yw[0] = X1w[0] + \varepsilon[0] \quad (2)$$

The magnetic disk device 1 controls positioning of the write head 15W so as to follow the target write path Xw[1] at the time of writing the write track WT[1]. In practice, the write head 15W runs on an actual write path Yw[1] when writing the write track WT[1]. The actual write path Yw[1] is expressed by the following formula.

$$\begin{aligned}Yw[1] &= X1w[1] + X3w[1] \\ &= X1w[1] + X2w[1] + \varepsilon[1] \\ &= X1w[1] + \beta X3w[0] + \varepsilon[1] \\ &= X1w[1] + \beta \varepsilon[0] + \varepsilon[1]\end{aligned} \quad (3)$$

Here, e[1] is a feedback residual error E in the write track WT[1].

The magnetic disk device 1 controls positioning of the write head 15W so as to follow the target write path Xw[2] at the time of writing the write track WT[2]. In practice, the write head 15W runs on an actual write path Yw[2] when writing the write track WT[2]. The actual write path Yw[2] is expressed by the following formula.

$$\begin{aligned}Yw[2] &= X1w[2] + X3w[2] \\ &= X1w[2] + X2w[2] + \varepsilon[2] \\ &= X1w[2] + \beta X3w[1] + \varepsilon[2] \\ &= X1w[2] + \beta(X2w[1] + \varepsilon[1]) + \varepsilon[2] \\ &= X1w[2] + \beta\{(\beta X2w[0] + \varepsilon[0]) + \varepsilon[1]\} + \varepsilon[2] \\ &= X1w[2] + \beta^\wedge 2 \times \varepsilon[0] + \beta\varepsilon[1] + \varepsilon[2]\end{aligned} \quad (4)$$

Here, ε[2] is a feedback residual error E in the write track WT[2].

The magnetic disk device 1 controls positioning of the write head 15W so as to follow the target write path Xw[n] at the time of writing the write track WT[n]. In practice, the write head 15W runs on an actual write path Yw[n] when writing the write track WT[n]. The actual write path Yw[n] is expressed by the following formula.

$$Yw[n]=X1[n]+\beta^n \times \varepsilon[0]+\beta^{(n-1)} \times \varepsilon[1]+ \ldots +\beta^0 \times \varepsilon[n] \quad (5)$$

Here, ε[n] is a feedback residual error ε in the write track WT[n].

A read track width RW[n-1] of a read track RT[n-1] in the case where the write track WT[n] has been overwritten on a previous write track WT[n-1] of the write track WT[n] is expressed by the following formula using Formula (5).

$$RW[n-1]=Yw[n-1]-Yw[n]=\{X1w[n-1]+\beta^{(n-1)} \times \varepsilon[0]+\beta^{(n-2)} \times \varepsilon[1]+ \ldots +\beta^0 \times \varepsilon[n-1]\}-\{X1w[n]+\beta^n \times \varepsilon[0]+\beta^{(n-1)} \times \varepsilon[1]+ \ldots +\beta^1 \times \varepsilon[n-1]+\beta^0 \times \varepsilon[n]\}=X1w[n-1]-X1w[n]+(\beta-1)\{\beta^{(n-1)} \times \varepsilon[0]+\beta^{(n-2)} \times \varepsilon[1]+ \ldots +\varepsilon[n-1]\}+\varepsilon[n] \quad (6)$$

Here, "X1w[n-1]-X1w[n]" is a distance (hereinafter referred to as an initial track pitch) TP between a central position in the radial direction of the write track WT[n-1] written by causing the write head 15W to follow the initial write path X1w[n-1] and a central position in the radial direction of the write track WT[n] written by causing the write head 15W to follow the initial write path X1w[n].

Thus, the read track width RW[n-1] is expressed by the following formula.

$$RW[n-1]=TP+(1-\beta)\{\beta^{(n-1)} \times \varepsilon[0]+\beta^{(n-2)} \times \varepsilon[1]+ \ldots +\varepsilon[n-1]\}+\varepsilon[n] \quad (7)$$

Here, it is assumed that a variance of the feedback residual error ε in all tracks of a particular band region is σ^2.

In this case, an expected value E(RW) of the read track width RW[n-1] and a variance V(RW) of the read track width RW are expressed by the following formulas.

$$E(RW)=TP \quad (8)$$

$$V(RW)=2/(1+\beta) \times \sigma^2 \quad (9)$$

The variance V(RW) is calculated as $2\sigma^2$ by Formula (9) if the gain β=0, that is, in the case of not following the current write position and the current target write path generated based on the previous write position information by the ATC, which is twice of each positioning accuracy (variance σ^2) of the two write tracks adjacent in the radial direction. The variance V(RW) decreases as the gain β increases. The variance V(RW) becomes the minimum value σ^ when the gain β=1. Therefore, the read track width RW[n-1] of the read track RT[n-1] can be constant in the circumferential direction as the gain β increases.

That is, the larger the gain β is, the higher the effect obtained by the ATC can be. A compression ratio C of the read track width RW[n-1] by the ATC is expressed by the following formula.

$$C=1/(1+\beta) \quad (10)$$

In the example illustrated in FIG. 7, the offset value X3w[0] is ε[0] in the write track WT[0]. Therefore, a variance of the offset value X3w[0] is the variance σ^2 of the feedback residual error ε[0].

In the write track WT[1], the write position correction value X2w[1] is βX3w[0]. Therefore, a variance of the write position correction value X2w[1] is $\beta^2 \times \sigma^2$. In addition, the offset value X3w[1] is X3w[1]=Yw[1]-X1w[1]=X2w[1]+ε[1] in the write track WT[1]. Assuming that the variance $\beta^2 \times \sigma^2$ of the write position correction value X2w[1] and the variance σ^2 of the feedback residual error ε[1] are uncorrelated, a variance of the offset value X3w[1] becomes $(1+\beta^2) \times \sigma^2$.

In the write track WT[2], the write position correction value X2w[2] is βX3w[1]. Therefore, the variance of the write position correction value X2w[2] is $\beta^2(1 \times \beta^2)\sigma^2$. In addition, the offset value X3w[2] is X3w[2]=Yw[2]-X1w[2]=X2w[2]+ε[2] in the write track WT[2]. Assuming that the variance $\beta^2(1+\beta^2)\sigma^2$ of the write position correction value X2w[2] and the variance σ^2 of the feedback residual error e[1] are uncorrelated, a variance of the offset value X3w[1] becomes $(1+\beta^2+\beta^4) \times \sigma^2$.

In the write track WT[n], a variance of the write position correction value X2w[n] is $\beta^2(1 \times \beta^2+\beta^4+ \ldots +\beta^{2n})\sigma^2$. When n→∞, a variance V(X2w) of the write position correction value X2w[n] is $\beta^2/(1-\beta^2) \times \sigma^2$. In addition, a variance of the offset value X3w[n] is $(1+\beta^2+\beta^4+ \ldots +\beta^{2n}+\beta^2(n+1))$ in the write track [n]. When n→∞, a variance V(X3w) of the offset value X3w[n] is $1/(1-\beta^2) \times \sigma^2$.

The variance V(X3w) is σ^2 when the gain β=0, that is, in the case of not following the current write position and the current target write path generated based on the previous write position information by the ATC. The variance V(X3w) indicates that the offset value (PES) X3w increases as the gain (increases. The offset value X3w diverges when the gain 3=1 with the variance V(X3w).

Therefore, the gain β<1 needs to be satisfied. An amplification factor K of the offset value (PES) X3w according to the ATC is expressed by the following formula.

$$K=1/\sqrt{(1-\beta^2)} \quad (11)$$

Figure 8:
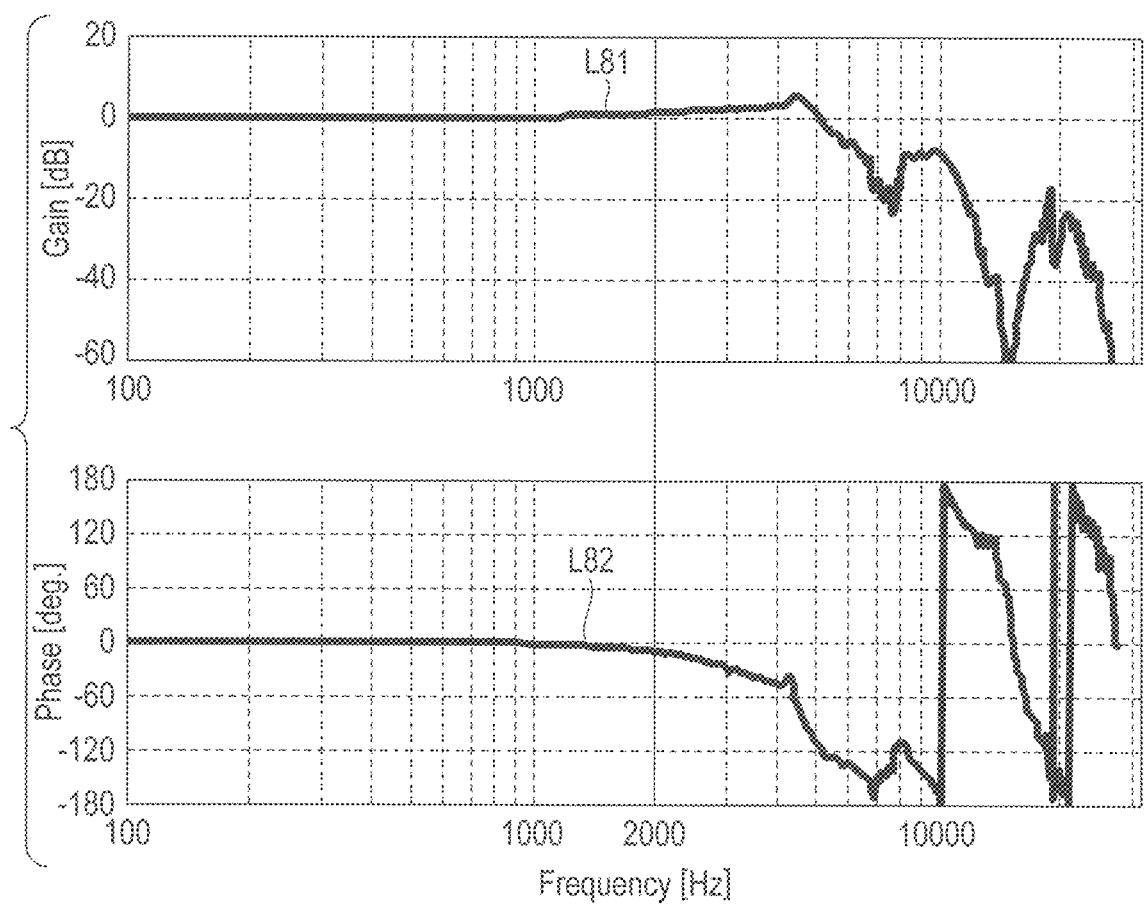
FIG. 8 is a Bode diagram illustrating a gain and a phase of an input/output signal according to transfer characteristics of a feedback system.

FIG. 8 is a Bode diagram illustrating a gain and a phase of an input/output signal according to transfer characteristics of the feedback system FS. In FIG. 8, the upper stage illustrates a gain diagram of the input/output signal according to the transfer characteristics of the feedback system FS, and the lower stage illustrates a phase diagram of the input/output signal according to the transfer characteristics of the feedback system FS. In the gain diagram, the vertical axis represents a gain [dB] of the input/output signal according to the transfer characteristics of the feedback system FS, and the horizontal axis represents an input/output frequency [Hz] in the feedback system FS. In the gain diagram, a line L81 indicates a gain change with respect to a frequency. In the phase diagram, the vertical axis represents a phase [deg.], and the horizontal axis represents a frequency [Hz]. In the phase diagram, a line L82 indicates a phase change with respect to a frequency.

In the example illustrated in FIG. 8, the gain is 1.0 up to about 2000 [Hz], and there is no phase delay. In FIG. 8, a frequency band (hereinafter also referred to as a following band in some cases) capable of following the target write path Xw with the write head 15W is up to about 2000 [Hz] in the feedback system FS.

In this case, the ATC band is also up to about 2000 [Hz]. On the other hand, a phase delay occurs in a frequency band of 2000 [Hz] or higher. It is understood that an output signal is amplified with respect to an input signal from a gain of about 4500 [Hz]. When the offset value (PES) X3w is recorded in the table TB according to the transfer characteristics of the feedback system FS illustrated in FIG. 8, there is a possibility that it is difficult to accurately follow the current write position and the current target write path based on the previous write position information with frequency components equal to or higher than 2000 [Hz] among frequency components included in the previous write position information. In addition, when the previous write position information includes a frequency component of 4500 [Hz], there is a possibility that the write position correction value X2w increases whenever moving from the current write track to the next write track and diverges. In the write ATC, a filter configured to compensate for a phase and a gain can be installed in order to prevent the divergence of the write position correction value X2w. However, even when the filter configured to compensate for the phase and gain is installed, a frequency band where it is possible to follow the current write position and the current target write path generated based on the previous write position information by the write ATC conforms to a frequency band where it is possible to cause the write head 15W to follow the target write path Xw by the feedback system FS. Therefore, it is difficult to suppress fluctuations in the read track width in the entire frequency band of the offset value X3w even by the write ATC. Incidentally, the frequency band where the write head 15W can follow the target write path Xw has been set to up to 2000 [Hz], but may be a value other than 2000 [Hz]. The low frequency component passing through the low-pass filter, which has been stated as an example of the above-described filter S62, includes, for example, a frequency component of 2000 [Hz].

FIG. 9 is a diagram illustrating an example of a power spectrum the feedback residual error ε and a power cumulative sum of it. In FIG. 9, the upper stage illustrates a diagram of the power spectrum of the feedback residual error ε, and the lower stage illustrates a diagram of the power cumulative sum which is a cumulative sum of a power spectrum of the feedback residual error ε. In the diagram of the power spectrum, the vertical axis represents a power spectrum [dBμm] of the feedback residual error e, and the horizontal axis represents a frequency [Hz] of the feedback residual error ε. In the diagram of the power spectrum, a solid line L91 indicates a change of a power spectrum with respect to a frequency at the feedback residual error ε when the write control system SY1 is affected by a disturbance, and a broken line L92 indicates a change of a power spectrum with respect to a frequency at the feedback residual error ε when the write control system SY1 is not affected by the disturbance. In the diagram of the power cumulative sum of the feedback residual error e, the vertical axis represents a power cumulative sum of the feedback residual error ε [nm^2] of the feedback residual error ε, and the horizontal axis represents a frequency [Hz] of the feedback residual error ε. In the diagram of the power cumulative sum of the feedback residual error ε, a solid line L93 corresponds to a cumulative sum of a power spectrum of the solid line L91 and a broken line L94 corresponds to a cumulative sum of a power spectrum of the broken line L92. The diagram of the power cumulative sum of the feedback residual error ε illustrates a point P11 on the solid line L93, a point P12 on the solid line L93, a point P21 on the broken line L94 and a point P22 on the broken line L94. The point P11 indicates a power cumulative sum of the feedback residual error ε (about 23 nm^2) at a frequency of 2000 [Hz], the point P12 indicates a power cumulative sum of the feedback residual error ε (about 38 nm^2) at a frequency of 30000 [Hz], the point P21 indicates a power cumulative sum of the feedback residual error ε (about 6 nm^2) at the frequency of 2000 [Hz], and the point P22 indicates a power cumulative sum of the feedback residual error ε (about 21 nm^2) at the frequency of 30000 [Hz]. In FIG. 9, the ATC band is equivalent to the following band, for example, is assumed to be lower than 2000 [Hz].

Since the ATC band is lower than 2000 [Hz] in the example illustrated in FIG. 9, it is possible to suppress the power cumulative sum of the feedback residual error ε by suppressing the power spectrum having a frequency of lower than 2000 [Hz] and to compress the read track width RW. On the other hand, since the ATC band is lower than 2000 [Hz], there is a possibility that it is difficult to suppress a power spectrum having a frequency of 2000 [Hz] or higher, that is, the read track width RW is not compressed. In the example illustrated in FIG. 9, when the power cumulative sum of the feedback residual error ε changes as indicated by the solid line L93, the power ratio γ is, for example, γ=a total sum of power cumulative sums of the feedback residual error E of lower than 2000 [Hz] (about 23 nm^2)/a total sum of power cumulative sums of the feedback residual error E of all frequency bands (about 38 nm^2)=0.6. In addition, when the power cumulative sum of the feedback residual error ε changes as indicated by the broken line L94, the power ratio γ is, for example, γ=a total sum of power cumulative sums of the feedback residual error e of lower than 2000 [Hz] (about 6 nm^2)/a total sum of power cumulative sums of the feedback residual error e of the entire frequency band (about 21 nm^2)=0.3.

Hereinafter, an amplification factor of the offset value X3w when the write ATC is executed and a compression ratio of a variation ΔWR of the read track width RW when the write ATC is executed will be derived.

First, the amplification factor of the offset value X3w when the write ATC is executed will be derived. Assuming the variance V(ε) of the offset value X3w when the write ATC is not executed, a variance V1(ε) of the offset value X3w in the ATC band and a variance V2(ε) of the offset value X3w outside the ATC band are expressed by the following formulas, respectively, using the power ratio γ.

$$V1(\varepsilon)=\gamma V(\varepsilon) \tag{12}$$

$$V2(\varepsilon)=(1-\gamma)\times V(\varepsilon) \tag{13}$$

A variance V3(ε) of the offset value X3w of the entire frequency band when the write ATC is executed is expressed by the following formula using a PES amplification factor K.

$$\begin{aligned}V3(\varepsilon) &= K^{\wedge}2 \times V1(\varepsilon) + V2(\varepsilon) \\ &= (1 + (K^{\wedge}2 - 1) \times \gamma) \times V(\varepsilon) \\ &= (1 + \gamma \times \beta^{\wedge}2/(1 - \beta^{\wedge}2)) \times V(\varepsilon)\end{aligned} \tag{14}$$

Therefore, the amplification factor of the offset value X3w when the write ATC is executed is expressed by the following formula.

$$\sqrt{\{V3(\varepsilon)/V(\varepsilon)\}}=\sqrt{(1+\gamma\times\beta^{\wedge}2/(1-^{\wedge}2))} \tag{15}$$

Next, the compression ratio of the variation ΔWR of the read track width RW when the write ATC is executed will be derived. A variance V0(ΔWR) of the variation ΔWR of the read track width RW when the write ATC is not executed is expressed by the following formula using the variance V(c) of the offset value X3w.

$$V0(\Delta WR)=2V(\varepsilon) \tag{16}$$

A variance V4(ΔWR) of the variation ΔWR of the variation ΔWR of the read track width RW within the ATC band when the write ATC is not executed and a variance V5(ΔWR) of the variation ΔWR of the read track width RW outside the ATC band when the write ATC is not executed are expressed by the following formulas, respectively.

$$V4(\Delta WR)=2\times\gamma\times V(\varepsilon) \tag{17}$$

$$V5(\Delta WR)=2\times(1-\gamma)\times V(\varepsilon) \tag{18}$$

A variance V6(ΔWR) of the variation ΔWR of the read track width RW of the ATC band when the write ATC is executed is expressed by the following formula using the compression ratio C of the read track width.

$$V6(\Delta WR) = C \times V4(\Delta WR) = 2/(1+\beta) \times \gamma \times V(\varepsilon) \quad (19)$$

A variance V7(ΔWR) of the variation ΔWR of the read track width RW of the entire frequency band when the write ATC is executed is expressed by the following formula.

$$V7(\Delta WR) = V6(\Delta WR) + V5(\Delta WR) = 2 \times [\gamma/(1+\beta) + 1 - \gamma] \times V(\varepsilon) \quad (20)$$

Therefore, the compression ratio of the variation ΔWR of the read track width RW when the write ATC is executed is expressed by the following formula.

$$\sqrt{\{V7(\Delta WR)/V0(\Delta WR)\}} = \sqrt{[\gamma/(1+\beta) + 1 - \gamma]} \quad (21)$$

FIG. 10 is a graph illustrating an example of a change of an amplification factor of the offset value X3w when the write ATC on the gain β is executed. In FIG. 10, the vertical axis represents an amplification factor $\sqrt{\{V3(\varepsilon)/V(\varepsilon)\}}$ of the offset value X3w when the write ATC is executed, and the horizontal axis represents the gain β. FIG. 10 illustrates lines L101, L102, L103, L104, and L105. The line L101 indicates the amplification factor $\sqrt{\{V3(\varepsilon)/V(\varepsilon)\}}$ with respect to the gain β when the power ratio γ=0. The line L102 indicates the amplification factor $q\{V3(\varepsilon)/V(\varepsilon)\}$ with respect to the gain β when the power ratio γ=0.3. The line L103 indicates the amplification factor $\sqrt{\{V3(\varepsilon)/V(\varepsilon)\}}$ with respect to the gain β when the power ratio γ=0.6. The line L104 indicates the amplification factor $\sqrt{\{V3(\varepsilon)/V(\varepsilon)\}}$ with respect to the gain β when the power ratio γ=0.8. The line L105 indicates the amplification factor $\sqrt{\{V3(\varepsilon)/V(\varepsilon)\}}$ with respect to the gain β when the power ratio γ=1.

In the example illustrated in FIG. 10, the amplification factor $\sqrt{\{V3(\varepsilon)/V(\varepsilon)\}}$ increases as the gain β increases, and diverges in the vicinity of the gain β=1. In addition, an increase rate of the amplification factor $\sqrt{\{V3(\varepsilon)/V(\varepsilon)\}}$ with respect to the gain β may be large when the power ratio γ is large.

FIG. 11 is a graph illustrating an example of a change of a compression ratio of the variation ΔWR in the read track width RW when the write ATC on the gain β is executed. In FIG. 11, the vertical axis represents a compression ratio $\sqrt{\{V7(\Delta WR)/V0(\Delta WR)\}}$ of the variation ΔWR in the read track width RW when the write ATC is executed, and the horizontal axis represents the gain β. FIG. 11 illustrates lines L111, L112, L113, L114, and L115. The line L111 indicates the compression ratio $q\{V7(\Delta WR)/V0(\Delta WR)\}$ with respect to the gain Q when the power ratio γ=0. The line L112 indicates the compression ratio $\sqrt{\{V7(\Delta WR)/V0(\Delta WR)\}}$ with respect to the gain β when the power ratio γ=0.3. The line L113 indicates the compression ratio $\sqrt{\{V7(\Delta WR)/V0(\Delta WR)\}}$ with respect to the gain β when the power ratio γ=0.6. The line L114 indicates the compression ratio $\sqrt{\{V7(\Delta WR)/V0(\Delta WR)\}}$ with respect to the gain β when the power ratio γ=0.8. The line L115 indicates the compression ratio $\sqrt{\{V7(\Delta WR)/V0(\Delta WR)\}}$ with respect to the gain β when the power ratio γ=1.

In the example illustrated in FIG. 11, the compression ratio $\sqrt{\{V7(\Delta WR)/V0(\Delta WR)\}}$ decreases as the gain β increases. In other words, the compression ratio $\sqrt{\{V7(\Delta WR)/V0(\Delta WR)\}}$ is compressed as the gain β increases. In addition, a decrease rate of the compression ratio $\sqrt{\{V7(\Delta WR)/V0(\Delta WR)\}}$ with respect to the gain β may be large when the power ratio γ is large.

When a disturbance as illustrated by the power spectrum indicated by the solid line L91 in FIG. 9, and the power cumulative sum of the feedback residual error e indicated by the solid line L93 in FIG. 9 is input to the write control system SY1, the power ratio γ is 0.6, for example. When the power ratio γ=0.6, the compression ratio $\sqrt{\{V7(\Delta WR)/V0(\Delta WR)\}}$ can be decreased to about 84% from that of FIG. 11, for example. For example, when the compression ratio $\sqrt{\{V7(\Delta WR)/V0(\Delta WR)\}}$ is set to 90% or less at the power ratio γ=0.6 and the amplification factor $\sqrt{\{V3(\varepsilon)/V(\varepsilon)\}}$ is set to be lower than 10%, the gain β is in the range from 0.45 to 0.50 based on FIG. 10 and FIG. 11. In this case, the compression ratio $\sqrt{\{V7(\Delta WR)/V0(\Delta WR)\}}$ can be decreased to about 89%. For example, when the amplification factor $\sqrt{\{V3(\varepsilon)/V(\varepsilon)\}}$ is lower than 10% at the power ratio γ=0.8, the gain β is in the range of 0.50 or less based on FIG. 10. When the gain β is 0.50 or less, the compression ratio $\sqrt{\{V7(\Delta WR)/V0(\Delta WR)\}}$ can be decreased to about 87%.

When a disturbance as illustrated by the power spectrum indicated by the broken line L92 in FIG. 9 and the power cumulative sum of the feedback residual error e indicated by the broken line L94 in FIG. 9 is input to the write control system SY1, the power ratio γ is, for example, 0.3. When the power ratio γ=0.3, the compression ratio $\sqrt{\{V7(\Delta WR)/V0(\Delta WR)\}}$ can be decreased to about 92% from that of FIG. 11, for example. For example, when the amplification factor $\sqrt{\{V3(\varepsilon)/V(\varepsilon)\}}$ is lower than 10% at the power ratio γ=0.8, the gain β is in the range of 0.65 or less based on FIG. 10. When the gain β is 0.65 or less, the compression ratio $\sqrt{\{V7(\Delta WR)/V0(\Delta WR)\}}$ can be decreased to about 94%. Since the power ratio γ changes due to the disturbance input to the write control system SY1 in this manner, the gain β that is optimum to execute the write ATC can be changed.

The write control system SY1, for example, the adjuster S6 changes the gain β based on the change of the amplification factor $\sqrt{\{V3(\varepsilon)/V(\varepsilon)\}}$ with respect to the offset value X3w, the power ratio γ, or the gain β illustrated in FIG. 10, and the change of the compression ratio $\sqrt{\{V7(\Delta WR)/V0(\Delta WR)\}}$ with respect to the gain β illustrated in FIG. 11. Therefore, the write control system SY1 (the magnetic disk device 1) can suppress deterioration of write performance caused by an increase of the offset value X3w, and can optimize the variation ΔRW of the read track width RW. Incidentally, the change of the amplification factor $\sqrt{\{V3(\varepsilon)/V(\varepsilon)\}}$ with respect to the gain β illustrated in FIG. 10 and the change of the compression ratio $\sqrt{\{V7(\Delta WR)/V0(\Delta WR)\}}$ with respect to the gain β illustrated in FIG. 11 may be recorded in a particular recording region, for example, the disk 10, the volatile memory 70, the buffer memory 80, the nonvolatile memory 90, or the like.

FIG. 12 is a flowchart illustrating an example of a write processing method according to the embodiment.

The system controller 130 calculates the offset value X3w for each sampling period (B1201). For example, the system controller 130 calculates the offset value X3w based on the initial write position X1w and the actual write position Yw. The system controller 130 calculates a power cumulative sum (B1202). For example, the system controller 130 calculates a cumulative square sum of a power spectrum of the entire frequency band. When calculating the power cumulative sum, the system controller 130 increments a count value (B1203). The system controller 130 determines whether the count value is equal to or smaller than a count threshold or is larger than the count threshold (B1204). If it is determined that the count value is equal to or smaller than the count threshold (NO in B1204), the system controller 130 proceeds to the process of B1201. If it is determined that the count threshold is larger than the count threshold (YES in B1204), the system controller 130 proceeds to a process of B1209.

The system controller 130 cuts off a particular frequency component (B1205). For example, the system controller 130 passes frequency components of the ATC band and suppresses frequency components of a frequency band larger than the ATC band. The system controller 130 calculates a power cumulative sum (B1206). For example, the system controller 130 calculates a cumulative square sum of a power spectrum of the ATC band. When calculating the power cumulative sum, the system controller 130 increments a count value (B1207). The system controller 130 determines whether the count value is equal to or smaller than a count threshold or is larger than the count threshold (B1208). When it is determined that the count value is equal to or smaller than the count threshold (NO in B1208), the system controller 130 proceeds to the process of B1201. When it is determined that the count threshold is larger than the count threshold (YES in B1208), the system controller 130 calculates the power ratio γ (B1209). For example, the system controller 130 calculates the power ratio as a ratio of the cumulative square sum of a power spectrum of the entire frequency band relative to the cumulative square sum of a power spectrum of the ATC band. The system controller 130 sets the gain β in accordance with the power ratio γ (B1210). The system controller 130 resets the count value (B1211). The system controller 130 calculates the target write position Xw and executes write processing (B1211) based on the write position correction value X2w calculated based on the gain R and the offset value X3w, and ends the processing.

According to the present embodiment, the magnetic disk device 1 calculates the power ratio γ based on the offset value X3w calculated based on the initial write position X1w and the actual write position Yw. The magnetic disk device 1 sets the optimum gain β in accordance with the power ratio γ. The magnetic disk device 1 calculates the target write position Xw based on the write position correction value X2w calculated based on the offset value X3w and the gain β and the initial write position X1w. The magnetic disk device 1 calculates the write position error ew based on the target write position Xw and the actual write position Yw. The magnetic disk device 1 drives the actuator AC in accordance with the write positioning drive amount Uw calculated based on the write error and moves the write head 15W to the actual write position Yw. Since the optimum gain β can be set in accordance with the power ratio γ, the magnetic disk device 1 can position the head 15 (write head 15W) at an optimum position in the radial direction. In addition, the variation ΔRW of the read track width can be suppressed. Therefore, the magnetic disk device 1 can improve write processing performance. In addition, read performance can be improved.

Next, magnetic disk devices according to other embodiments and modifications will be described. In the other embodiments and modifications, the same parts as those in the above-described embodiment will be denoted by the same reference signs, and a detailed description thereof will be omitted.

(First Modification)

A magnetic disk device 1 of a first modification is different from that of the above-described embodiment in terms of a configuration of a write control system SY1.

FIG. 13 is a block diagram illustrating an example of a positioning control system SY1 of a head 15 during write processing according to the first modification.

The write control system SY1 further includes a compensator S9, a delayer S10, and a calculation unit CL4.

The compensator S9 generates a correction value of a drive amount Uw (hereinafter referred to as a drive correction value). For example, the compensator S9 generates a drive correction value U1w (C, S+1) based on a write position correction value X2w (C, S+1).

The delayer S10 performs delay by a particular period. For example, the delayer S10 delays a drive correction value U1w (C, S+1) for positioning the head 15W at a write target position of a next sector (C, S+1), positioned in a progressing direction of a current sector (C, S), by one sampling period.

A controller S2 outputs the write positioning drive amount Uw to the calculation unit CL4. The calculation unit CL4 receives the write positioning drive amount Uw and a drive correction value U1w. The calculation unit CL4 outputs a write drive amount (hereinafter referred to as an actual write drive amount) U2w, obtained by adding a drive correction value U1w (C, S) to the drive amount Uw, to an actuator S3. The actual write drive amount U2w is input to the actuator S3. The actuator S3 is driven according to the actual write drive amount U2w and moves the head 15, for example, the write head 15W to an actual write position Yw corresponding to the actual write drive amount U2w.

A variable gain S7 outputs the write position correction value X2w (C, S+1) obtained by multiplying an offset value X3w (C−1, S+1) by a gain R set according to a power ratio γ to the delayer S8 and the compensator S9. The compensator S9 receives the write position correction value X2w (C, S+1) obtained by multiplying the gain β set according to the power ratio γ. The compensator S9 outputs the drive correction value U1w (C, S+1) to the delayer S10. The delayer S10 outputs the drive correction value U1w (C, S) obtained by delaying the drive correction value U1w (C, S+1), obtained by multiplying the gain β set according to the power ratio γ, by one sampling period to the calculation unit CL4.

According to the first modification, the magnetic disk device 1 corrects the drive amount Uw based on the drive correction value U1w. As a result, it is possible to improve the gain divergence and the phase delay in the transfer characteristics of the feedback system as illustrated in FIG. 8, that is, it is possible to improve the ATC band, and thus, it is possible to operate the magnetic disk device 1 in a state where the power ratio γ is large so that it is possible to improve the ATC-following gain β. Therefore, the magnetic disk device 1 can improve write processing performance.

(Second Modification)

A magnetic disk device 1 of a second modification is different from that of the above-described embodiment in terms of a configuration of an adjuster S6.

FIG. 14 is a block diagram illustrating an example of the adjuster S6 according to the second modification.

The adjuster S6 further includes an amplifier S65 and a comparator S66.

The amplifier S65 performs multiplication by a particular value. The amplifier S65 outputs, for example, a value obtained by multiplying a cumulative square sum A output from a cumulative sum calculator S61 by the particular value.

The comparator S66 selects an output signal according to an input signal. For example, the comparator S66 compares an output from the amplifier S65 with a cumulative sum calculator S63, and outputs a power ratio γ based on a comparison result. In one example, the comparator S66 directly outputs the power ratio γ when a ratio of a power cumulative sum of a low frequency band relative to a power cumulative sum of the entire frequency band is equal to or higher than a particular ratio, for example, 70%. In addition, the comparator S66 outputs the power ratio γ=0 when the ratio of the power cumulative sum of the low frequency band relative to the power cumulative sum of the entire frequency band is lower than the particular ratio, for example, 70%. Incidentally, the comparator S66 may be configured to be capable of outputting several power ratios in accordance with the ratio of the power cumulative sum of the low frequency band relative to the power cumulative sum of the entire frequency band.

The cumulative sum calculator S61 outputs the cumulative square sum A to the amplifier S65. The cumulative square sum A is input to the amplifier S65. The amplifier S65 outputs a value obtained by multiplying the cumulative square sum A by a particular value to the comparator S66. The cumulative sum calculator S63 outputs a cumulative square sum B to the comparator S66. The value obtained by multiplying the cumulative square sum by the particular value and the cumulative square sum B are input to the comparator S66. The comparator S66 outputs the power ratio γ based on the value obtained by multiplying the cumulative square sum by the particular value and the cumulative square sum B.

FIG. 15 is a graph illustrating an example of a change of a gain β with respect to the power ratio γ according to the second modification. In FIG. 15, the vertical axis represents the gain β, and the horizontal axis represents the power ratio γ. FIG. 15 illustrates thresholds βth2, βth3, βth4, γth3, γth4, and γth5. Hereinafter, the thresholds βth2, βth3, and βth4 may be referred to as gain thresholds, and the thresholds γth3, γth4, and γth5 may be referred to as power ratio thresholds in some cases. FIG. 6 illustrates a solid line L151 and a broken line L152. The solid line L151 indicates the gain β that is zero at the power ratio γ lower than the power ratio threshold γth3 and is the gain threshold β (gain) βth2 at the power ratio γ equal to or higher than the power ratio threshold γth3. The broken line L152 indicates the gain β that is zero at the power ratio γ lower than the power ratio threshold γth3, is the gain threshold (gain) βth3 at the power ratio γ equal to or higher than the power ratio threshold γth3 and lower than the power ratio threshold γth4, is the gain threshold (gain) βth4 at the power ratio γ equal to or higher than the power ratio threshold γth4 and lower than the power ratio threshold γth5, and is the gain threshold (gain) βth5 at the power ratio γ equal to or higher than the power ratio threshold γth5.

The magnetic disk device 1 discontinuously changes the gain β with respect to the power ratio γ as indicated by the solid line L151 or the broken line L152, for example. Incidentally, the magnetic disk device 1 may discontinuously change the gain β with respect to the power ratio γ in a manner other than the example illustrated in FIG. 15.

According to the second modification, the magnetic disk device 1 can change the gain β discontinuously with respect to the power ratio γ. Therefore, the magnetic disk device 1 can improve the write processing performance.

Incidentally, the magnetic disk device 1 according to the above-described embodiment and the modifications can also be applied to a normal recording method other than the shingled magnetic recording. For example, the magnetic disk device 1 of the above-described embodiment and the modifications can be applied to sequentially write tracks (data) to the disk 10 by the normal recording method.

In addition, the power ratio γ is obtained by calculation of a cumulative square sum in a desired frequency band in the above description, but may be obtained from a ratio of a signal level after converting power into a DC signal using a rectifier circuit or the like as another embodiment.

In addition, the power ratio γ is obtained as a ratio of a position error signal intensity in the ATC band relative to a position error signal intensity in the entire frequency band, but may be obtained as a ratio of the position error signal intensity in the ATC band relative to a position error signal intensity in a wide frequency band including the ATC band.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk;
a head that writes data to the disk and reads data from the disk; and
a controller that obtains a gain to be changed according to a first value calculated based on first position information of the head and second position information of the head when writing a first track to the disk, calculates third position information of the head calculated based on the gain and the second position information, and writes a second track adjacent to the first track in a radial direction according to the third position information.

2. The magnetic disk device according to claim 1, wherein the controller calculates the first value as a ratio of a second cumulative square sum of a power spectrum of a second frequency band included in a first frequency band of the first position information relative to a first cumulative square sum of a power spectrum of the first frequency band of the first position information.

3. The magnetic disk device according to claim 2, wherein, the controller continuously changes the gain with respect to the first value.

4. The magnetic disk device according to claim 3, wherein, the controller changes the gain in proportion to the first value.

5. The magnetic disk device according to claim 2, wherein, the controller changes the gain discontinuously with respect to the first value.

6. The magnetic disk device according to claim 5, wherein the controller sets the gain to zero when the first value is smaller than a first threshold, and sets the gain to a second value when the first value is equal to or larger than the first threshold.

7. The magnetic disk device according to claim 2, wherein the controller is capable of causing the head to follow a path of the head when writing the second track generated based on the first position information in the second frequency band.

8. The magnetic disk device according to claim 2, wherein the first frequency band is an entire frequency band of the first position information.

9. The magnetic disk device according to claim 1, wherein the controller changes the gain based on an amplification factor corresponding to the first position information and the first value.

10. The magnetic disk device according to claim 1, wherein the controller changes the gain based on a compression ratio of a variation in width in the radial direction between the first track and the second track, and the first value.

11. A write processing method that is applied to a magnetic disk device comprising a disk and a head that writes data to the disk and reads data from the disk, the write processing method comprising:

obtaining a gain to be changed according to a first value calculated based on first position information of the head and second position information of the head when writing a first track to the disk;

calculating third position information of the head calculated based on the gain and the second position information; and writing a second track adjacent to the first track in a radial direction according to the third position information.

12. The write processing method according to claim 11, further comprising:

calculating the first value as a ratio of a second cumulative square sum of a power spectrum of a second frequency band included in a first frequency band of the first position information relative to a first cumulative square sum of a power spectrum of the first frequency band of the first position information.

13. The write processing method according to claim 12, further comprising:

continuously changing the gain with respect to the first value.

14. The write processing method according to claim 13, further comprising:

changing the gain in proportion to the first value.

15. The write processing method according to claim 12, further comprising:

changing the gain discontinuously with respect to the first value.

16. The write processing method according to claim 15, further comprising:

setting the gain to zero when the first value is smaller than a first threshold, and setting the gain to a second value when the first value is equal to or larger than the first threshold.

17. The write processing method according to claim 12, wherein it is possible to cause the head to follow a path of the head when writing the second track generated based on the first position information in the second frequency band.

18. The write processing method according to claim 12, wherein the first frequency band is an entire frequency band of the first position information.

19. The write processing method according to claim 11, further comprising:

changing the gain based on an amplification factor corresponding to the first position information and the first value.

20. The write processing method according to claim 11, further comprising:

changing the gain based on a compression ratio of a variation in width in the radial direction between the first track and the second track, and the first value.

* * * * *